(12) United States Patent
Cheng et al.

(10) Patent No.: US 11,665,624 B2
(45) Date of Patent: May 30, 2023

(54) MEASUREMENT CONFIGURATION FOR GLOBAL CELL IDENTIFIER REPORTING

(71) Applicant: Qualcomm Incorporated, San Diego, CA (US)

(72) Inventors: Peng Cheng, Beijing (CN); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/041,628

(22) PCT Filed: Apr. 11, 2019

(86) PCT No.: PCT/CN2019/082272
§ 371 (c)(1),
(2) Date: Sep. 25, 2020

(87) PCT Pub. No.: WO2019/196906
PCT Pub. Date: Oct. 17, 2019

(65) Prior Publication Data
US 2021/0120481 A1    Apr. 22, 2021

(30) Foreign Application Priority Data
Apr. 13, 2018   (WO) ................ PCT/CN2018/082984

(51) Int. Cl.
*H04W 48/10* (2009.01)
*H04W 36/00* (2009.01)
(Continued)

(52) U.S. Cl.
CPC ......... *H04W 48/10* (2013.01); *H04J 11/0073* (2013.01); *H04W 36/0058* (2018.08); *H04W 36/00835* (2018.08); *H04W 56/001* (2013.01)

(58) Field of Classification Search
None
See application file for complete search history.

(56) References Cited

U.S. PATENT DOCUMENTS

| | | | |
|---|---|---|---|
| 9,408,125 | B2 | 8/2016 | Horn et al. |
| 2014/0087715 | A1 | 3/2014 | Suzuki et al. |

(Continued)

FOREIGN PATENT DOCUMENTS

| | | |
|---|---|---|
| CN | 101754286 A | 6/2010 |
| CN | 101841824 A | 9/2010 |

(Continued)

OTHER PUBLICATIONS

ZTE Corporation, et al., "Consideration on Report CGI Measurement", 3GPP Draft, 3GPP TSG-RAN WG2 Meeting #101, R2-1802024, Feb. 5, 2018 (Feb. 15, 2018), 3 Pages (Year: 2018).*

(Continued)

*Primary Examiner* — Saad Khawar

(57) ABSTRACT

A wireless device may receive a first synchronization signal block (SSB) in a radio frequency band of a first cell of a neighbor base station, and report a physical cell identifier (PCI) for the first cell to a serving base station. The serving base station may identify, based on the PCI report, whether a radio frequency band of the first SSB is in or off a synchronization raster, and determine whether to instruct the UE to report a global cell identifier (CGI) for the neighbor base station (e.g., CGI for the neighbor cell) based on the identification. The wireless device may identify CGI based system information obtained from the neighbor cell, system information obtained from a master cell associated with the neighbor base station, system information obtained from CGI broadcast from the neighbor cell, or system information requested from the neighbor cell using dedicated resources, based on the instruction.

22 Claims, 22 Drawing Sheets

(51) Int. Cl.
*H04J 11/00* (2006.01)
*H04W 56/00* (2009.01)

(56) References Cited

U.S. PATENT DOCUMENTS

| | | | | |
|---|---|---|---|---|
| 2019/0281510 A1* | 9/2019 | Yilmaz | ............ | H04W 36/0058 |
| 2020/0092774 A1* | 3/2020 | Sharma | ........... | H04W 36/00835 |
| 2021/0014718 A1* | 1/2021 | Li | ..................... | H04W 36/0094 |
| 2021/0153082 A1* | 5/2021 | Axmon | ............ | H04W 36/0055 |

FOREIGN PATENT DOCUMENTS

| | | |
|---|---|---|
| CN | 102868990 A | 1/2013 |
| CN | 103037434 A | 4/2013 |
| CN | 106797579 A | 5/2017 |
| EP | 2249608 A1 | 11/2010 |
| EP | 3209082 A1 | 8/2017 |
| WO | WO-2014008380 A1 | 1/2014 |
| WO | WO-2019192724 A1 | 10/2019 |

OTHER PUBLICATIONS

International Search Report and Written Opinion—PCT/CN2018/082984—ISA/EPO—dated Jan. 3, 2019.
International Search Report and Written Opinion—PCT/CN2019/082272—ISA/EPO—dated Jun. 28, 2019.
ZTE Corporation, et al., "Consideration on Report CGI Measurement", 3GPP, R2-1804380, Mar. 2, 2018 (Mar. 2, 2018), 4 Pages.
Supplementary European Search Report—EP19785808—Search Authority—Munich—dated Nov. 25, 2021.
ZTE Corporation, et al., "Consideration on Report CGI Measurement", 3GPP Draft, 3GPP TSG-RAN WG2 Meeting #101, R2-1802024 Consideration on Report CGI Measurement, 3rd Generation Partnership Project (3GPP), Mobile Competence Centre, 650, Route Des Lucioles, F-06921 Sophia-Antipolis Cedex, France, vol. Ran WG2, No. Athens, Greece, Feb. 26, 2018-Mar. 2, 2018, Feb. 15, 2018 (Feb. 15, 2018), XP051399794, 3 Pages, Retrieved from the Internet: URL: http://www.3gpp.org/ftp/tsg%5Fran/WG2%5FRL2/TSGR2%5F101/Docs/, [retrieved on Feb. 15, 2018], p. 2, line 22-line 32.
NTT Docomo, Inc. (Rapporteur): "RAN WG's Progress on NR WI in the February Meeting 2018", 3GPP TSG-RAN WG2#101bis, R2-1804394, Apr. 16-20, 2018, Sanya, China, pp. 1-85.
Vivo: "ANR Description for SA and NSA," 3GPP TSG-RAN WG2 #101 bis, R2-1804608, Apr. 16-20, 2018, 7 Pages.

* cited by examiner

MEASUREMENT CONFIGURATION FOR GLOBAL CELL IDENTIFIER REPORTING

CROSS REFERENCE

The present Application is a 371 national phase filing of International Patent Application No. PCT/CN2019/082272 by CHENG et al., entitled "Measurement Configuration for Global Cell Identifier Reporting," filed Apr. 11, 2019; and to International Patent Application No. PCT/CN2018/082984 by CHENG et al., entitled "Measurement Configuration for Global Cell Identifier Reporting," filed Apr. 13, 2018, each of which is assigned to the assignee hereof and each of which is hereby incorporated by reference in its entirety.

BACKGROUND

The following relates generally to wireless communications, and more specifically to measurement configuration for global cell identifier reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may be configured to operate in dual connectivity, carrier aggregation, or both. For example, the UE may communicate with cells of multiple base stations simultaneously, communicate with one base station on multiple cells, or a combination thereof. In these types of systems, neighboring base stations may lack information about one another and, in some cases, may communicate in an uncoordinated manner. If base stations or UEs do not account for possible confusion or uncoordinated communication between and among base stations, system efficiency and mobility with these base stations may suffer.

Self-organizing networks (SONs) attempt to simplify and speed up the configuration, management, and optimization of mobile communications networks. A SON may include automatic neighbor relation (ANR) functionality. A network operator (e.g., including a serving base station) may maintain a neighbor list of nearby cells (e.g., neighbor cells of neighboring base stations, which may be operated by different network operators). In ANR, a UE scans for, detects, and reports detected cells that are automatically added to the neighbor list. Conventional ANR techniques, however, may inefficiently scan detected cells for information used for ANR functionality, for example where a neighbor cell beamforming techniques for transmission of synchronization signals. Improved techniques for scanning, detection, and reporting of neighbor cells may thus be desired.

SUMMARY

The described techniques relate to improved methods, systems, devices, or apparatuses that support measurement configuration for global cell identifier (CGI) reporting. Generally, the described techniques provide for improved network automatic neighbor relation (ANR) functionality in the presence of neighboring cells operated by different network operators, operating according to different radio access technologies (RATs) or deployments, and/or in the presence of neighboring cells operating using millimeter wave (mmW) or beamformed transmissions.

A serving base station may support ANR functionality, where a network operator (e.g., providing the serving base station) may maintain a neighbor list of nearby cells for handover procedures, coordinated communication between and among base stations, etc. A wireless device (e.g., a user equipment (UE)) may receive a first synchronization signal block (SSB) in a radio frequency band of a first cell of a neighbor base station, and may report a physical cell identifier (PCI) for the first cell to the serving base station, the PCI identified from the received first SSB. The serving base station may receive the PCI and identify whether the PCI is known (e.g., present on a neighbor list) or unknown (e.g., not associated with an entry on the neighbor list). In cases where the serving base station will add the neighbor cell to the neighbor list (e.g., in scenarios where the reported PCI from the UE is unknown), the serving base station may transmit an instruction for the UE to report a CGI for the neighbor base station (e.g., a CGI associated with the neighbor cell associated with the neighbor base station). The UE may identify CGI associated with the neighbor base station (e.g., by receiving remaining minimum system information (RMSI) or a system information block (SIB) type 1 (SIB1) associated with the neighbor cell), and report the CGI to the serving cell. The network operator or serving base station may then update the neighbor list with the PCI, CGI, or both, corresponding to the neighbor cell.

In some examples, the serving base station may identify whether a radio frequency band of the first SSB (e.g., the SSB from which the PCI reported by the UE was derived) was received in a synchronization raster (e.g., by the UE), and determine whether to instruct the UE to report CGI associated with the neighbor cell accordingly. For example, the serving base station may identify a radio frequency band associated with the first SSB (e.g., the serving base station may derive the frequency location of the SSB from a measurement ID included in the PCI measurement report), and determine whether the frequency associated with the SSB is in synchronization raster (e.g., associated with a frequency defined by the synchronization raster) or off synchronization raster. In scenarios where the SSB associated with the reported PCI is in synchronization raster, the base station may instruct the UE to report CGI associated with the neighbor cell. The UE may obtain system information associated with the first SSB (e.g., the UE may obtain a SIB1 associated with the neighbor cell), identify CGI based on the system information, and transmit the CGI to the serving base station. In scenarios where the SSB associated with the reported PCI is off synchronization raster, the base station may instruct the UE according to one of the following procedures.

In some cases, the serving base station may not instruct the UE to report CGI when the first SSB is off synchronization raster. In other cases, the serving base station may instruct the UE to jump frequencies (e.g., switch frequencies) to obtain system information associated with a master cell (e.g., a master cell associated with the neighbor base station, indicated by the received SSB associated with the neighbor cell). The UE may derive the neighbor cell ID (e.g., the CGI associated with the original target neighbor cell, or the neighbor cell associated with the reported unknown PCI) from the system information, and may report the CGI of the neighbor cell to the serving base station. In yet other cases, the neighbor cell may be configured to broadcast CGI. In such cases, when the serving base station instructs the UE to report CGI and the SSB from the neighbor cell is off synchronization raster, the UE may determine a timing reference associated with CGI broadcast (e.g., from the SSB), and may receive system information (e.g., CGI) from the broadcast CGI. In yet other cases, uplink resources may be reserved (e.g., as dedicated uplink resources) for the UE to send a CGI request. In such cases, when the serving base station instructs the UE to report CGI and the SSB from the neighbor cell is off synchronization raster, the UE may determine a timing reference associated with the dedicated uplink resources for CGI (e.g., from the SSB), and may request system information (e.g., CGI) from the neighbor cell during the dedicated uplink resources for CGI. The UE may receive system information in response to the CGI request, and the UE may report the CGI to the serving base station.

A method of wireless communication at a UE is described. The method may include receiving a first SSB in a radio frequency band of a first cell of a second base station, reporting a PCI for the first cell to a first base station based on the received first SSB, receiving, from the first base station in response to the reported PCI, an instruction to report a CGI for the second base station, and transmitting the CGI to the first base station based on the received instruction and whether the radio frequency band of the first SSB was received in a synchronization raster.

An apparatus for wireless communication at a UE is described. The apparatus may include a processor, memory in electronic communication with the processor, and instructions stored in the memory. The instructions may be executable by the processor to cause the apparatus to receive a first SSB in a radio frequency band of a first cell of a second base station, report a PCI for the first cell to a first base station based on the received first SSB, receive, from the first base station in response to the reported PCI, an instruction to report a CGI for the second base station, and transmit the CGI to the first base station based on the received instruction and whether the radio frequency band of the first SSB was received in a synchronization raster.

Another apparatus for wireless communication at a UE is described. The apparatus may include means for receiving a first SSB in a radio frequency band of a first cell of a second base station, reporting a PCI for the first cell to a first base station based on the received first SSB, receiving, from the first base station in response to the reported PCI, an instruction to report a CGI for the second base station, and transmitting the CGI to the first base station based on the received instruction and whether the radio frequency band of the first SSB was received in a synchronization raster.

A non-transitory computer-readable medium storing code for wireless communication at a UE is described. The code may include instructions executable by a processor to receive a first SSB in a radio frequency band of a first cell of a second base station, report a PCI for the first cell to a first base station based on the received first SSB, receive, from the first base station in response to the reported PCI, an instruction to report a CGI for the second base station, and transmit the CGI to the first base station based on the received instruction and whether the radio frequency band of the first SSB was received in a synchronization raster.

Some examples of the method, apparatuses, and non-transitory computer-readable medium described herein may further include operations, features, means, or instructions for determining, by the UE, that the first SSB was received in the synchronization raster. Some examples of the method, apparatuses, and non-transitory computer-readable medium described herein may further include operations, features, means, or instructions for receiving, from the second base station, system information associated with the first SSB, identifying the CGI based on the system information and transmitting the CGI to the first base station.

Some examples of the method, apparatuses, and non-transitory computer-readable medium described herein may further include operations, features, means, or instructions for determining that system information may be not associated with the first SSB, receiving, from the second base station, a second SSB where the second SSB may be indicated at least in part by the first SSB, receiving, from the second base station, system information associated with the second SSB, where the second SSB may be received based on the received first SSB, identifying the CGI based on the system information and transmitting the CGI to the first base station.

Some examples of the method, apparatuses, and non-transitory computer-readable medium described herein may further include operations, features, means, or instructions for determining, by the UE, that the first SSB was received off the synchronization raster. Some examples of the method, apparatuses, and non-transitory computer-readable medium described herein may further include operations, features, means, or instructions for determining system information may be not associated with the first SSB, receiving an indication to determine system information associated with a second cell of the second base station, identifying the CGI based on the system information and transmitting the CGI to the first base station. In some examples of the method, apparatuses, and non-transitory computer-readable medium described herein, the second cell includes a master LTE eNB of the second base station operating in a non-standalone mode.

Some examples of the method, apparatuses, and non-transitory computer-readable medium described herein may further include operations, features, means, or instructions for determining a timing reference associated with a broadcast CGI based at least in part based on the received first SSB, receiving, from the second base station, a broadcast CGI based on a transmission pattern associated with the timing reference, identifying the CGI based on the broadcast CGI and transmitting the CGI to the first base station. Some examples of the method, apparatuses, and non-transitory computer-readable medium described herein the parameters of the transmission pattern include a transmission periodicity and an offset. Some examples of the method, apparatuses, and non-transitory computer-readable medium described herein the parameters of the transmission pattern may be obtained from system information.

Some examples of the method, apparatuses, and non-transitory computer-readable medium described herein may further include operations, features, means, or instructions for determining a timing reference associated with dedicated resources for CGI at least in part based on the received first SSB, transmitting a CGI request in the dedicated resources based on a transmission pattern associated with the timing reference, receiving the CGI based on the transmitted CGI request and transmitting the CGI to the first base station.

Some examples of the method, apparatuses, and non-transitory computer-readable medium described herein the parameters of a transmission pattern of the dedicated resources for CGI include a transmission periodicity and an offset. Some examples of the method, apparatuses, and non-transitory computer-readable medium described herein the parameters of a transmission pattern of the dedicated resources for CGI may be obtained from system information.

In some examples of the method, apparatuses, and non-transitory computer-readable medium described herein, the CGI request may be transmitted in a request of a random access procedure and the CGI may be received in a response of the random access procedure. In some examples of the method, apparatuses, and non-transitory computer-readable medium described herein, the instruction to report the CGI may be transmitted by the first base station may be based on a determination, by the first base station, that the first SSB was received in the synchronization raster.

In some examples of the method, apparatuses, and non-transitory computer-readable medium described herein, reporting the PCI may include operations, features, means, or instructions for transmitting a measurement report that includes the PCI for the first cell and a measurement identifier associated with receiving the first SSB, where the instruction to report the CGI may be based on the PCI and the measurement identifier. Some examples of the method, apparatuses, and non-transitory computer-readable medium described herein may further include operations, features, means, or instructions for receiving a first portion of the CGI in a first broadcast CGI message, receiving a second portion of the CGI in a second broadcast CGI message and identifying the CGI based on the first portion and the second portion.

Some examples of the method, apparatuses, and non-transitory computer-readable medium described herein may further include operations, features, means, or instructions for identifying a CGI broadcast pattern based one or more SSBs of a set of SSBs and receiving the CGI based on the identified CGI broadcast pattern. In some examples of the method, apparatuses, and non-transitory computer-readable medium described herein, the second base station includes a neighboring base station and the first base station includes a serving base station. A method of wireless communication at a first base station is described. The method may include receiving, from a UE, a PCI for a first cell of a second base station, identifying whether a radio frequency band of a first SSB used to identify the PCI was received in a synchronization raster, and determining whether to instruct the UE to report a CGI for the second base station based on the identification.

An apparatus for wireless communication at a first base station is described. The apparatus may include a processor, memory in electronic communication with the processor, and instructions stored in the memory. The instructions may be executable by the processor to cause the apparatus to receive, from a UE, a PCI for a first cell of a second base station, identify whether a radio frequency band of a first SSB used to identify the PCI was received in a synchronization raster, and determine whether to instruct the UE to report a CGI for the second base station based on the identification. Another apparatus for wireless communication at a first base station is described. The apparatus may include means for receiving, from a UE, a PCI for a first cell of a second base station, identifying whether a radio frequency band of a first SSB used to identify the PCI was received in a synchronization raster, and determining whether to instruct the UE to report a CGI for the second base station based on the identification.

A non-transitory computer-readable medium storing code for wireless communication at a first base station is described. The code may include instructions executable by a processor to receive, from a UE, a PCI for a first cell of a second base station, identify whether a radio frequency band of a first SSB used to identify the PCI was received in a synchronization raster, and determine whether to instruct the UE to report a CGI for the second base station based on the identification. Some examples of the method, apparatuses, and non-transitory computer-readable medium described herein may further include operations, features, means, or instructions for transmitting an instruction for the UE to report the CGI based on a determination that the first SSB was received in the synchronization raster and receiving the CGI from the UE based on the instruction.

Some examples of the method, apparatuses, and non-transitory computer-readable medium described herein may further include operations, features, means, or instructions for refraining from instructing the UE to report the CGI based on a determination that the first SSB was received off the synchronization raster. Some examples of the method, apparatuses, and non-transitory computer-readable medium described herein may further include operations, features, means, or instructions for transmitting an instruction for the UE to report the CGI based on a determination that the first SSB was received off the synchronization raster and receiving the CGI from the UE based on the transmitted instruction.

Some examples of the method, apparatuses, and non-transitory computer-readable medium described herein may further include operations, features, means, or instructions for transmitting an instruction for the UE to obtain system information from a second cell of the second base station to identify the CGI and receiving the CGI from the UE in response to the transmitted instruction. In some examples of the method, apparatuses, and non-transitory computer-readable medium described herein, the second cell includes a master LTE eNB of the first base station operating in a non-standalone mode.

Some examples of the method, apparatuses, and non-transitory computer-readable medium described herein may further include operations, features, means, or instructions for transmitting a CGI reporting configuration to the UE and receiving, from the UE, the CGI in a CGI report configured based on the transmitted CGI reporting configuration. Some examples of the method, apparatuses, and non-transitory computer-readable medium described herein may further include operations, features, means, or instructions for transmitting a CGI reporting configuration to the UE that indicates that the UE may be to measure and report cell level measurements.

Some examples of the method, apparatuses, and non-transitory computer-readable medium described herein may further include operations, features, means, or instructions for transmitting a CGI reporting configuration to the UE that indicates that the UE may be to measure and report beam level measurements. In some examples of the method, apparatuses, and non-transitory computer-readable medium described herein, the beam level measurements include a beam identifier. In some examples of the method, apparatuses, and non-transitory computer-readable medium described herein, the beam level measurements include a beam quality. In some examples of the method, apparatuses, and non-transitory computer-readable medium described herein, the beam level measurements include a beam identifier and beam quality.

DETAILED DESCRIPTION

Figure 1:
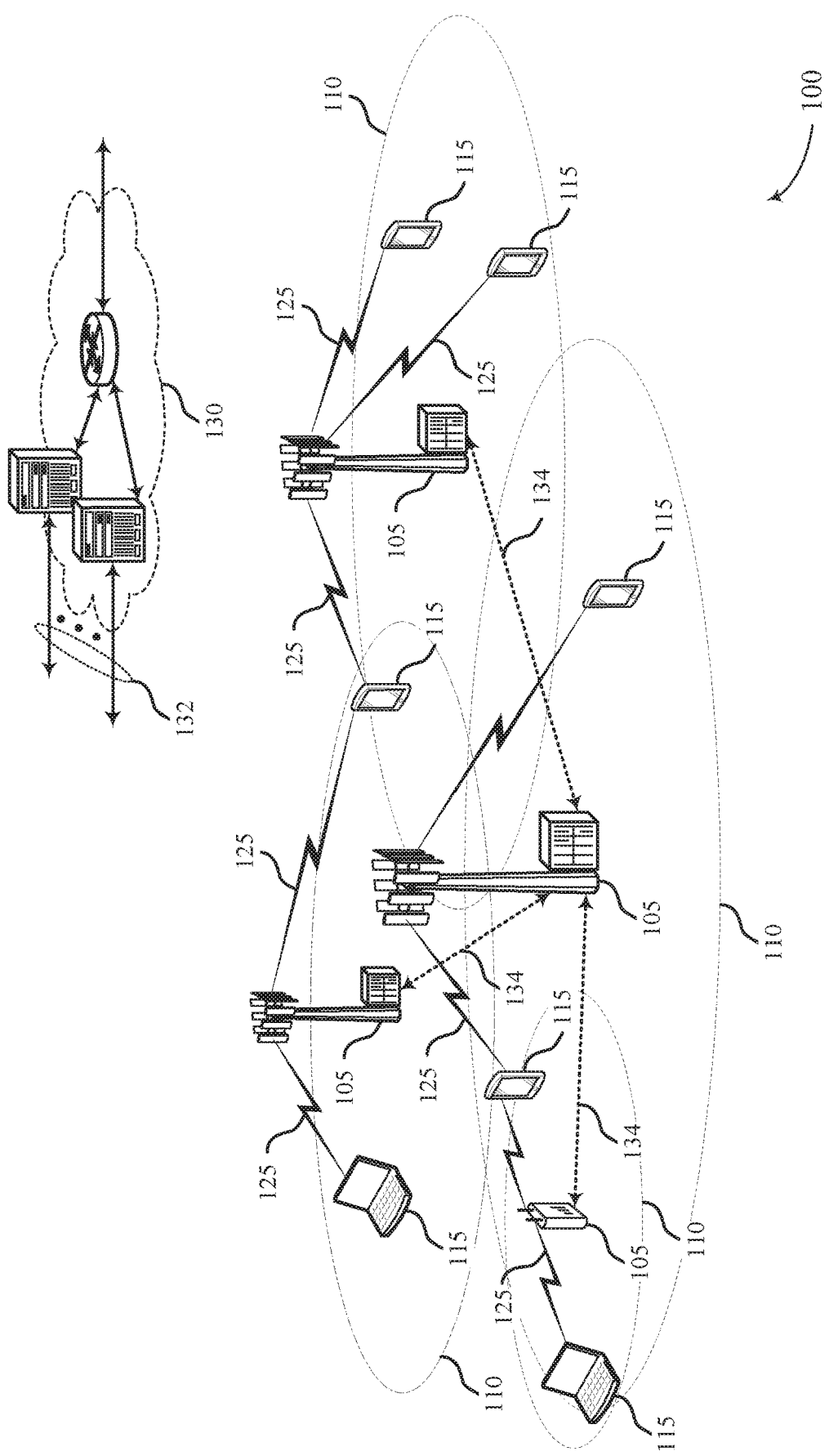
FIG. 1 illustrates an example of a wireless communications system that supports measurement configuration for global cell identifier reporting in accordance with aspects of the present disclosure.

In some cases, there is an inverse relationship between data rate and coverage range of a wireless network. Generally, as the data rates increase, the coverage range decreases. This inverse relationship may require network operators to deploy more cells (e.g., base stations, pico cells, femto cells, and the like) to handle coverage and capacity issues. A cell may typically maintain a neighbor list of nearby cells (e.g., to enable handover of a user equipment (UE) to and from another nearby cell, to coordinate or manage transmissions between cells, etc.). Further, the nearby cells may be associated with different radio access technologies (RATs) or deployments (e.g., wireless communications systems may include Long Term Evolution (LTE) cells, LTE-Advanced (LTE-A) cells, fifth generation (5G) cells which may be referred to as New Radio (NR) cells, etc.). Manually configuring and optimizing neighbor lists for a cell is an increasingly complicated and error-prone task as the number of cells within a network continues to increase.

To address this issue, self-organizing networks (SON) may use an automatic neighbor relation (ANR) function to automatically create and maintain a neighbor list. That is, ANR functionality may generate relations between base stations, which may be used to establish connections between base stations, support mobility, load balancing, dual connectivity, etc. Initially, a UE may periodically scan for a local cell identifier (e.g., a physical cell identifier (PCI)) of cells within detection range, and send a PCI report to the UE's serving base station with one or more detected PCIs. The serving base station may then determine whether its neighbor list includes an entry for the detected PCIs. If the neighbor list does not have an entry corresponding to one or more of the detected PCIs, the serving base station may instruct the UE to measure a global cell identifier (e.g., a cell global identity (CGI)) of any unknown cell. The global cell identifier may refer to an identifier through which a cell can be uniquely identified. For example, the CGI may be made up of a public land mobile network (PLMN) identifier, a local area code (LAC), and a cell identifier (e.g., CGI may be determined based on PLMN+LAC+Cell ID). CGI detection may include UE decoding of both a master information block (MIB) and a system information block (SIB) of the unknown cell (e.g., CGI may be determined from SIB1 of the neighbor cell).

In some wireless communications systems (e.g., such as NR systems), devices operating in millimeter wave (mmW) bands may have multiple antennas to allow beamforming. That is, a base station may use multiple antennas or antenna arrays to conduct beamforming operations for directional communications with a UE (e.g., to overcome signal attenuation, multipath issues, etc. associated with high frequencies). Beamforming (which may also be referred to as spatial filtering or directional transmission) is a signal processing technique that may be used at a transmitter (e.g., a base station) to shape and/or steer an overall antenna beam in the direction of a target receiver (e.g., a UE). This may be achieved by combining elements in an antenna array in such a way that transmitted signals at particular angles experience constructive interference while others experience destructive interference.

In such systems, detection of neighbor cell (e.g., to determine identifying information for the neighbor cell, such as a PCI) may be based on synchronization signal blocks (SSBs). A base station may transmit SSBs (e.g., a group of signals transmitted over a set of time and frequency resources), which may include discovery reference signals or other synchronization signals. For example, an SSB may include a primary synchronization signal (PSS), a secondary synchronization signal (SSS), one or more physical broadcast channel (PBCH) signals, or other synchronization or reference signals. In some examples, the signals included in an SSB may be time division multiplexed. In other examples, PBCH transmissions may be transmitted in a subset of SSB time resources (e.g., in two symbols of an SSB), and synchronization signals (e.g., PSS and SSS) may be transmitted in another subset of SSB time resources. Furthermore, for example in deployments that use mmW transmission frequencies, multiple SSBs may be transmitted in different directions using beam sweeping in a synchronization signal (SS) burst, and SS bursts may be periodically transmitted according to an SS burst set.

In some examples, NR systems may therefore include a synchronization raster (which, in some cases, may be referred to as a sync raster, a synchronization signal raster, etc.) that may designate potential positions where the UE may receive and decode a synchronization signal, such potential positions not necessarily coinciding with the center frequency of a given channel. In some examples, an SSB index indicator in the PBCH payload may indicate the beam direction of the corresponding SSB. For example, the maximum number of possible beam directions for sub-6 systems (e.g., systems communicating using RF bands under 6 GHz) is 8, while the number of possible beam directions for above-6 systems (e.g., systems communicating using RF bands over 6 GHz) is 64. In some cases, the synchronization raster may not be aligned with the common physical resource block (PRB) grid of the channel and the base station may indicate the frequency offset between the synchronization signal and the common PRB using one of the fields of PBCH.

According to techniques described further below, a PCI for neighboring cells may be decoded from SSBs of neighboring cells (e.g., PCI may be decoded from primary synchronization signal (PSS) and secondary synchronization signal (SSS) included in SSBs). In some cases (e.g., in the presence of NR neighboring cells), SSBs including neighbor cell PCI, CGI, etc. may be in synchronization raster or off synchronization raster (e.g., of the serving cell). In cases where the base station requests CGI (e.g., in cases where the UE reports unknown PCI, or PCI not already present on the base station's neighbor list), the UE techniques and procedures may account for whether or not the SSBs associated with the neighbor cell are in synchronization raster or off synchronization raster.

For example, in cases where SSBs from a neighbor cell are received in synchronization raster, the UE (e.g., the UE that receives the SSB) may directly identify SIB1 of the SSB (e.g., or in some cases may identify another SSB that includes SIB1, where the another SSB may be indicated by a previously-received SSB) and report the global cell ID to the network (e.g., the UE may identify CGI from SIB1 of the SSB associated with the neighbor cell, and report the CGI to the serving base station).

In other examples (e.g., when the neighbor cell is a non-standalone cell), SSBs from a neighbor cell may be received off synchronization raster. In some cases, the base station may not initiate a CGI reporting procedure in cases where the frequency associated with the PCI is off synchronization raster (e.g., the base station may only instruct the UE to measure CGI for cells associated with in synchronization raster SSBs). In other cases, the UE may jump to a SIB1 of an indicated master cell associated with the neighbor cell to derive the neighbor cell ID (e.g., the CGI associated with the neighbor cell). That is, the UE may, in some cases, be instructed by the base station to measure SIB1 of an indicated master cell, and the SIB1 of the indicated master cell may include CGI associated with the corresponding neighbor cell (e.g., a master LTE eNB associated with the neighbor cell, such as a neighbor NR cell, may include CGI for the neighbor NR cell in the SIB1). In some examples, cells (e.g., neighbor cells) may be configured to broadcast global cells IDs in some sparse transmission pattern (e.g., the CGI may not always be broadcast in SIB1). In such examples, the UE may determine a timing reference (e.g., associated with broadcast CGIs) from SSB received off synchronization raster, and may wait for the broadcast CGI and report the received CGI to the base station. In yet other examples, uplink resources may be dedicated for the UE to send requests for CGI. In such cases, the uplink resources dedicated for CGI reporting may be identified from the received SSB, and the UE may determine a timing reference through the SSB and await the dedicated uplink resources for requesting the CGI. When the latest dedicated uplink resources comes, the UE may send a first random access message (e.g., a CGI request, a random access channel (RACH) preamble, or RACH Msg 1 of a two-step RACH procedure) in the dedicated uplink resource, and the neighbor cell may send the CGI to the UE in a second random access message (e.g., in a CGI response, a random access request (RAR), or a RACH Msg 2 of a two-step RACH procedure). The UE may then report the received CGI to the serving base station for ANR functionality.

In some cases, wireless communications systems may also employ radio resource management (RRM) configuration for CGI reporting, for example where a CGI reporting configuration for a UE may be configured by a network (e.g., via the serving base station for the UE) using RRM signaling. In some cases, cell specific measurement and reporting may be configured. In other cases, beam specific measurement and reporting may be configured. In some cases, a combination of cell and beam specific measurement and reporting may be configured. For example, cell level measurement and reporting may be based on SSB or, in some cases, based on reference signal received power (RSRP), reference signal received quality (RSRQ), signal-to-interference plus noise ratio (SINR), etc. Beam level measurement and reporting may be based on SSB. Further, reporting types may include no report of beam level measurement, or reporting of a beam index, or reporting of beam index and beam layer 3 (L3) filtered RSRP/RSRQ/SINR, etc.

Beneficially, these techniques may provide for improved ANR functionality. Specifically, the described techniques may enable ANR and CGI reporting when a neighbor cell is associated with synchronization signals that are off a synchronization raster associated with a serving cell. As a result, the serving base station may be able to update and/or optimize its neighbor list to include an entry for unknown cells that may include non-standalone cells or cells under different deployments or RATs. The serving base station may thus be able to configure more efficient handovers, improved communication coordination, and so on, which may result in improved network performance and the ability to perform handovers to and from the unknown or neighbor cell.

Aspects of the disclosure are initially described in the context of a wireless communications system. Further aspects of the disclosure are described in the context of an additional wireless communications system and process flows. Aspects of the disclosure are further illustrated by and described with reference to apparatus diagrams, system diagrams, and flowcharts that relate to measurement configuration for global cell identifier reporting.

FIG. 1 illustrates an example of a wireless communications system 100 that supports measurement configuration for global cell identifier reporting in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Base stations 105 (e.g., a serving base station 105) may support ANR functionality, where a network operator (e.g., the serving base station 105) may maintain a neighbor list of nearby cells for handover procedures, coordinated communication between and among base stations 105, etc. UEs 115 may receive a first SSB in a radio frequency band of a first cell of a neighbor base station 105, and may report a PCI for the first cell to the serving base station 105 (e.g., identified from the received first SSB). Serving base stations 105 may receive PCIs and identify whether the PCI is known (e.g., present on a neighbor list) or unknown (e.g., not associated with an entry on the neighbor list). In cases where a serving base station 105 wishes to add the neighbor cell to the neighbor list (e.g., in scenarios where the reported PCI from a UE 115 is unknown), the serving base station 105 may transmit an instruction for the UE 115 to report a CGI for the neighbor base station 105 (e.g., a CGI associated with the neighbor cell associated with the neighbor base station 105). The UE 115 may identify CGI associated with the neighbor base station 105 (e.g., by receiving RMSI or a SIB1 associated with the neighbor cell), and report the CGI to the serving cell. The network operator or serving base station 105 may then update the neighbor list with the PCI and CGI corresponding to the neighbor cell.

In some examples, the serving base station 105 may identify whether a radio frequency band of the first SSB (e.g., that the PCI reported by the UE 115 was derived from) was received in a synchronization raster (e.g., by the UE 115), and determine whether to instruct the UE 115 to report CGI associated with the neighbor cell accordingly. For example, the serving base station 105 may identify a radio frequency band associated with the first SSB (e.g., the serving base station may derive the frequency location of the SSB from a measurement ID included in the PCI measurement report), and determine whether the frequency associated with the SSB is in synchronization raster (e.g., associated with a frequency defined by the synchronization raster) or off synchronization raster. In scenarios where the SSB associated with the reported PCI is in synchronization raster, the base station 105 may instruct the UE 115 to report CGI associated with the neighbor cell. The UE 115 may obtain system information associated with the first SSB (e.g., the UE may obtain SIB1 associated with the neighbor cell), identify CGI based on the system information, and transmit the CGI to the serving base station 105. In scenarios where the SSB associated with the reported PCI is off synchronization raster, the serving base station 105 may instruct the UE 115 as follows.

In some cases, the serving base station 105 may not instruct the UE 115 to report CGI when the first SSB is off synchronization raster. In other cases, the serving base station 105 may instruct the UE 115 to jump (e.g., switch frequencies) to obtain system information associated with a master cell (e.g., a master cell associated with the neighbor base station 105, indicated by the received SSB associated with the neighbor cell). The UE 115 may derive the neighbor cell ID (e.g., the CGI associated with the original target neighbor cell, or the neighbor cell associated with the reported unknown PCI) from the system information, and may report the neighbor cell CGI to the serving base station 105. In yet other cases, the neighbor cell may be configured to broadcast CGI. In such cases, when the serving base station 105 instructs the UE 115 to report CGI and the SSB from the neighbor cell is off synchronization raster, the UE 115 may determine a timing reference associated with CGI broadcast (e.g., from the SSB), and may receive system information (e.g., CGI) from the broadcast CGI. In yet other cases, dedicated uplink resources may be reserved for the UE 115 to send a CGI request. In such cases, when the serving base station 105 instructs the UE 115 to report CGI and the SSB from the neighbor cell is off synchronization raster, the UE 115 may determine a timing reference associated with the dedicated uplink resources for CGI (e.g., from the SSB), and may request system information (e.g., CGI) from the neighbor cell during the dedicated uplink resources for CGI. The UE 115 may receive system information in response to the CGI request, and the UE 115 may report the CGI to the serving base station 105.

Figure 2:
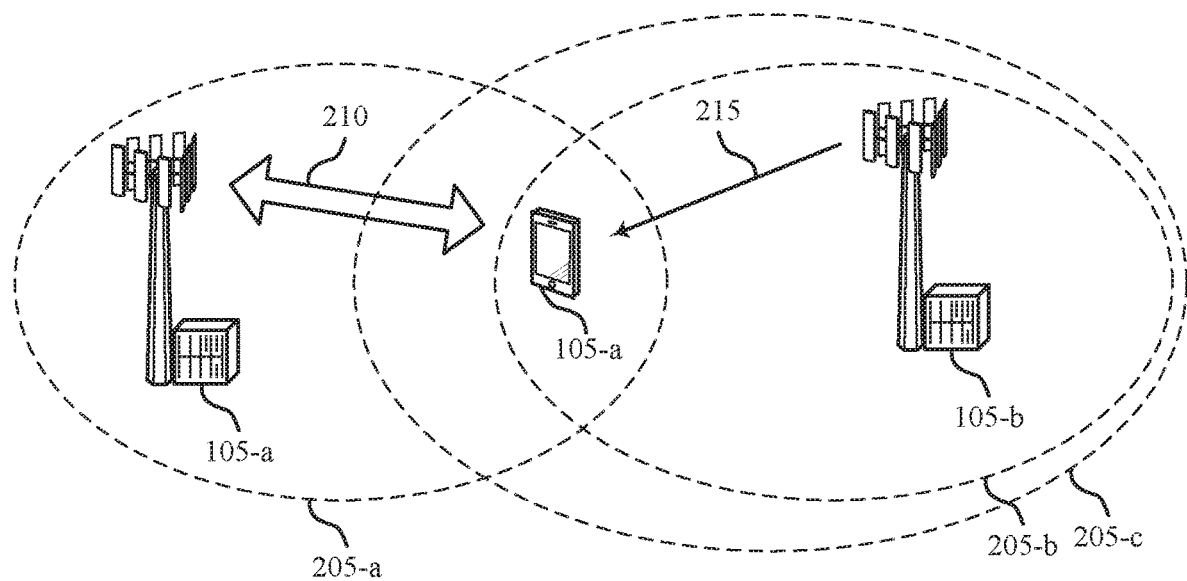
FIG. 2 illustrates an example of a wireless communications system that supports measurement configuration for global cell identifier reporting in accordance with aspects of the present disclosure.
Figure 2:
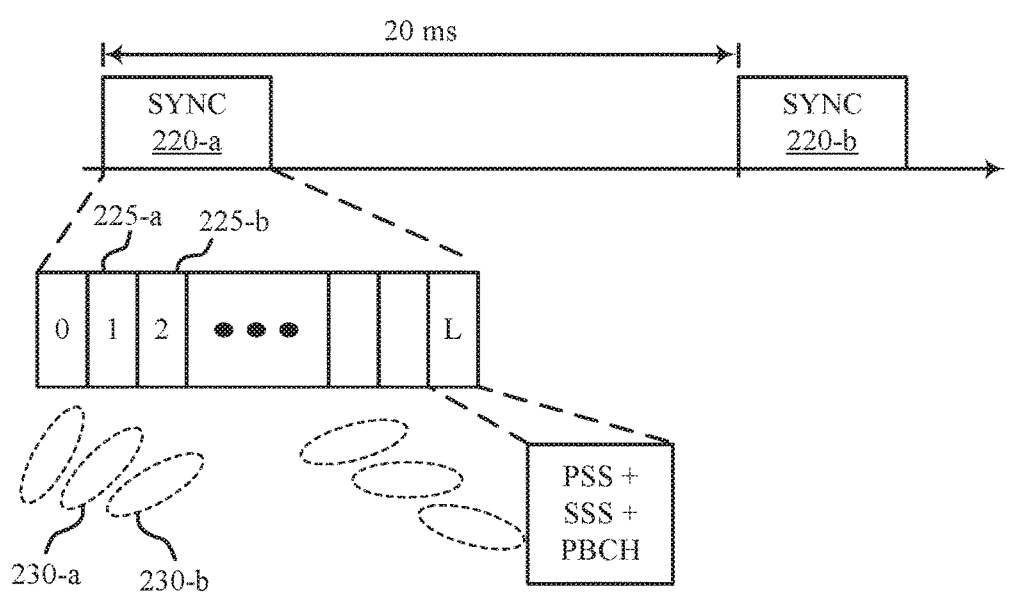

FIG. 2 illustrates an example of a wireless communications system 200 that supports measurement configuration for global cell identifier reporting in accordance with aspects of the present disclosure. In some examples, wireless communications system 200 may implement aspects of wireless communications system 100. Wireless communications system 200 may include a first wireless node, a second wireless node, and a third wireless node. In some examples, the first wireless node may be a base station 105-a, the second wireless node may be a base station 105-b, and the third wireless node may be UE 115-a, which may be examples of corresponding devices as described with reference to FIG. 1. Wireless communications system 200 may include a first base station 105-a (e.g., a serving base station associated with at least a first cell 205-a), a second base station 105-b (e.g., a neighbor base station associated with at least a second cell 205-b and a third cell 205-c), and a UE 115-a.

For ANR functionality, base station 105-a may request (e.g., by transmitting an instruction to) UE 115-a to report a CGI of base station 105-b (e.g., a cell 205-b associated with base station 105-b). For example, UE 115-a may detect a PCI of an unknown cell, such as cell 205-b of base station 105-b, and report the PCI to a serving base station 105-a. Serving base station 105-a may manage a neighbor list (e.g., a neighbor relation table) that includes information on neighboring cells. The neighbor list may be a table stored in a database that includes an entry for each neighbor cell. The serving base station 105-a may locally store the neighbor list, the neighbor list may be stored at some other location in the network that includes serving base station 105-a, or both. The serving base station 105-a may include an entry in the neighbor list for each known neighbor cell (e.g., in some cases, for both cell 205-b and cell 205-a). The entry may include at least the CGI and PCI of the neighbor cell (e.g., a neighbor relations table may include a local cell identifier, a PCI, and a global cell identifier, a CGI, associated with identified neighbor cells 205). In the present example, the base station 105-a may process the reported PCI of base station 105-b, determine that the PCI does not correspond to any entry in the neighbor list, and instruct the UE 115-a to measure and report the CGI of base station 105-b. Wireless communications system 200 may utilize such ANR functionality to generate relations between base stations 105. Such relations may be used to establish connections between base stations 105, to support mobility, load balancing, dual connectivity, handover, etc.

UE 115-a may receive an SSB (e.g., including decoding a PSS and/or SSS, or measuring one or more signals of the SSB) to obtain PCI associated with the neighboring cell, the UE 115-a may report the PCI to the base station 105-a. For example, PCI may be calculated from PCI-group indication (e.g., decoded in SSS) and PCI-ID indication (e.g., decoded in PSS). For example, the SSS may indicate a group sequence number (e.g., in the range of $N_{ID}^{(1)}=[0, 167]$) and the PSS may indicate a group specific sequence number (e.g., in the range of $N_{ID}^{(2)}=[0, 2]$) which together may indicate the PCI of the cell (e.g., $N_{ID}^{(cell)}=3*N_{ID}^{(1)}+N_{ID}^{(2)}$). Based on these reports, the base station 105-a may identify if a received PCI belongs to a neighbor base station (e.g., base station 105-b) in order to, for example, trigger or initiate a handover preparation procedure. In such cases, the serving base station (e.g., base station 105-a) may maintain a neighbor relation table that maps locally unique identifiers (e.g., PCIs) with globally unique identifiers (e.g., CGIs). CGIs may include a combination of PLMN ID (e.g., combination of country code and network code) and ECGI (e.g., combination of base station ID and cell ID). For example, in wireless communications system 200, UE 115-a may transmit a measurement report that includes the PCI or an indication of the PCI of cell 205-b to base station 105-a. Base station 105-a may determine the PCI is not on the neighbor list, and may instruct UE 115-a to read the CGI, the tracking area code (TAC), and all available PLMN IDs of cell 205-b. The neighbor cell (e.g., cell 205-b of base station 105-b) may broadcast its PLMN IDs, TAC, etc. in a SIB1 message. After identifying these values from the receiving SIB1 message, the UE 115-a may report the detected CGI to the serving base station (e.g., in a measurement report to base station 105-a), and base station 105-a may add the neighbor relation to the neighbor list, or update an existing neighbor relation. The base station 105-a may use the PCI and/or the CGI to lookup a transport layer address to the new base station (e.g., base station 105-b), update the neighbor relation list, and, if needed, setup a new interface (e.g., a new X2 interface) towards the base station 105-b.

In some examples, wireless communications system 200 may employ beamforming techniques (e.g., wireless communications system 200 may support beamformed communications over mmW frequencies). In some cases, synchronization signals may be transmitted in SSBs. Base station 105-a may transmit SSBs 215 using a predetermined multiplexing configuration. For example, base station 105-a may transmit multiple SSBs 225 transmitted according to a beam sweeping pattern (e.g., multiple SSBs may be transmitted in different directions, or according to different transmit beams 230. For example, base station 105-a may transmit an SS burst 220 that may include multiple SSBs 225, and the SSBs 225 may be transmitted using different transmit beams 230 (e.g., an SSB 225-a may be transmitted using transmit beam 230-a and SSB 225-b may be transmitted using transmit beam 230-b, where transmit beam 230-a and transmit beam 230-b may be associated with different directions, beam IDs, etc.). SSBs 225 may include synchronization information such as a PSS, an SSS, a PBCH, etc. For example, UE 115-a may decode PCI from PSS/SSS of SSBs 225 for ANR functionality.

In some examples, UE 115-a may detect other cells (e.g., cell 205-b, cell 205-c, etc.) by monitoring a broadcast control channel (BCCH) for SSBs 225 and identifying PSS/SSS (e.g., which may encode a PCI). In some cases, UE 115-a may autonomously detect the neighbor cell IDs from an acquired PSS/SSS (e.g., the network, or base station 105-a, may not provide a neighbor cell list). UE 115-a may detect and measure neighbor cells by sampling a window of time (e.g., 5 ms) on the target frequency (e.g., which may be the same or different from frequencies associated with the serving cell, or base station 105-a). In some cases, UE 115-a may search offline for PSS/SSS occurrences (e.g., from other cells 205) within the sample (e.g., within the sampling window of time).

For example, in some cases, UE 115-a may monitor a serving cell 205-a (e.g., an NR cell) according to some synchronization raster (e.g., a synchronization raster, an SS raster, etc.), and may monitor for and identify SSBs 220 associated with a neighboring cell 205-b (e.g., where the received SSB 220 may be on or off the synchronization raster associated with the serving cell 205-a). In some cases, a synchronization raster may also be referred to as an RF band, where the synchronization raster may correspond to a set of frequency locations (e.g., RF bands) where SS signals (e.g., in SSBs) may be transmitted. That is, a synchronization raster may indicate frequency positions of the SSB that may be used by the UE 115-a for system acquisition. A synchronization raster may refer to a subset of a channel raster, and may be sparse compared to a channel raster (e.g., such that latency for cell search may be reduced). For instance, a frequency raster may be 500 kHz and an SS bandwidth may be, for example, 5 MHz, and the SS may accordingly be placed at different locations in a system bandwidth such as from 0-5 MHz, 0.5-5.5 MHz, 1-6 MHz, etc. RF band information may be utilized at base station 105-a for scheduling purposes, enabling base station 105-a to efficiently schedule resources on RF bands at which UE 115-a may efficiently receive signaling from base station 105-a.

In some cases, the broadcast synchronization information associated with a cell 205 may depend on the type of cell 205 (e.g., the deployment associated with a cell 205). For example, a cell may be referred to as a standalone cell or a non-standalone cell. For example, a non-standalone cell may use LTE radio access and core network, with the addition of a 5G (or NR) carrier, to deliver enhanced mobile broadband. A standalone cell may refer to a cell that operates in, for example, a standalone 5G network (e.g., a standalone 5G cell may be associated with a core network, base stations, backhaul mechanisms, etc. that differ from the LTE core network, base stations, and backhaul mechanisms). For example, standalone cells 205 may provide for RACH procedures to directly establish RRC connections with an NR cell. Such standalone cells 205 may therefore broadcast both SSBs 225 as well as remaining minimum system information (RMSI). RMSI may include cell access information such as SIB1, SIB2, etc. (e.g., which may include cell access related parameters, scheduling of SIBs, common and shared channel configurations, RACH configuration information, etc.). In some cases, non-standalone cells may broadcast SSBs 225, but in some cases may not broadcast RMSI (e.g., a non-standalone cell may not always broadcast CGI).

In some cases, a base station may transmit a set of SSBs 225 to multiple UEs 115 (e.g., base station 105-a may transmit an SS burst 220) where the SSBs 225 may be frequency division multiplexed such that each SSB 225 is transmitted on a respective RF band. That is, in wider bands (e.g., such as NR bands) multiple SSBs 225 may be transmitted in different frequencies. In some cases, an SSB 225 may be off synchronization raster (e.g., not aligned with the synchronization raster associated with the serving cell 205-a). In such cases, the SSB 225 may not be associated with RMSI (e.g., the cell ID, or the CGI, may not be derived from the SIB1). For example, a non-standalone cell 205 may transmit SSBs 225, without RMSI, which may be received (e.g., off the synchronization raster) by UE 115-a. In other cases, an SSB 225 may be on synchronization raster. In cases where the SSB 225 is received on the synchronization raster, the SSB 225 may or may not be associated with RMSI. In cases where the SSB 225 is on the synchronization raster but is not associated with RMSI, the SSB 225 may include a signal (e.g., an indication) for the UE 115-*a* to find another SSB 225 with RMSI in the next synchronization raster. For example, an SSB 225 of SS burst 220-*a* may indicate another SSB, such as an SSB 225 of subsequent SS burst 220-*b*, may include RMSI for CGI reporting.

For multiple beam operation (e.g., under mmW deployments) cells may be derived using multiple beams (e.g., PSS/SSS may be included in SSBs 225 transmitted by base station 105-*b* using different transmit beams 230, which may be received by UE 115-*a* with different quality). For example, wireless communications system 200 may derive a single cell quality from multiple beams (e.g., from SSBs 225 transmitted by base station 105-*b* using different transmit beams 230), which may have different qualities (e.g., and an average beam quality may be determined). In addition to cell level reporting, wireless communications system 200 (e.g., NR systems) may support layer 3 (L3) beam level reporting (e.g., three kinds of beam level L3 reporting may include: no report of beam level measurement, or beam index reporting, or beam index and beam L3 filtered RSRP/RSRQ/SINR reporting, or some combination of these). Two types of reference signals (e.g., SSBs 225 and channel state information reference signal (CSI-RS)) may be used to perform radio resource management (RRM) (e.g., instead of cell specific reference signal (CRS)). CSI-RS based RRM may be introduced to provide more beam resolution. In some cases, configuration of CSI-RS may use PCI of its associated cell.

In some cases, base station 105-*a* may not configure CGI reporting (e.g., reportCGI measurements) if the frequency associated with the unknown PCI is off the synchronization raster. For example, base station 105-*a* may receive a measurement report (e.g., from UE 115-*a*, in communications 210) that includes an unknown PCI (e.g., associated with cell 205-*b*). Base station 105-*a* may check the measurement ID (e.g., the measID) included in the received measurement report, derive the frequency location of the associated measurement report (e.g., from the measID), and check whether such SSB 225 (e.g., associated with the cell 205-*b*) is located in or off the synchronization raster. If the associated frequency (e.g., the frequency associated with SSBs 225 of cell 205-*b*) is in synchronization raster (e.g. associated with serving cell 205-*a*), base station 105-*a* may instruct UE 115-*a* to perform CGI measurement. Otherwise, if the associated frequency is off synchronization raster, the base station 105-*a* may not initiate a CGI reporting procedure (e.g., the base station 105-*a* may only add on synchronization raster cells to the neighbor list).

In other examples, base station 105-*a* may configure UE 115-*a* to derive global cell ID (e.g., CGI) in another cell associated with the base station 105-*b*. For example, UE 115-*a* may report a PCI associated with cell 205-*b* and, upon determination that the PCI is not associated with an entry on the neighbor list, the base station 105-*a* may instruct UE 115-*a* to derive CGI in cell 205-*c* of base station 105-*b*. For example, in cases where base station 105-*b* operates in non-standalone mode, UE 115-*a* may report PCI associated with cell 205-*b* (e.g., an NR cell), base station 105-*a* may wish to add the NR cell 205-*b* associated with the PCI to the neighbor list, and may instruct UE 115-*a* to derive CGI in cell 205-*c* (e.g., a master LTE cell or eNB). Wireless communications system 200 may employ signaling in SSB off synchronization raster to indicate to (e.g., for base station 105-*a* to instruct UE 115-*a* to) find system information (e.g., SIB1) of its master LTE base station 105-*b* (e.g., LTE cell or cell 205-*c*). For example, in cases where SSBs 225 associated with cell 205-*b* (e.g., an NR cell) are not associated with RMSI, the base station 105-*a* may transmit an indication for the UE 115-*a* to find SIB1 of its master LTE eNB (e.g., to find SIB1 associated with cell 205-*c*). In such cases, the cell 205-*c* (e.g., an LTE cell or a master LTE eNB) may carry its NR cell 205-*b* CGI in its SIB1. In such scenarios, upon receiving a measurement report including an unknown PCI (e.g., a PCI not on the neighbor list), base station 105-*a* may instruct UE 115-*a* to perform and report a CGI measurement (e.g., whether the SSB is in or off synchronization raster). If the SSB 225 is in synchronization raster, UE 115-*a* may directly find the associated SIB1 (e.g., the SIB associated with cell 205-*b*) or may find the SIB1 in some subsequent SSB indicated by the first SSB 225. Otherwise, if the SSB 225 is off raster, the UE 115-*a* may switch (e.g., jump or switch frequency) to the SIB1 of the indicated master LTE eNB (e.g., the cell 205-*c*) to derive the NR cell ID (e.g., the cell 205-*b* ID). The UE 115-*a* may then report the NR cell (e.g., the cell 205-*c*) global ID to the base station 105-*a*. For example, in some cases the base station 105-*a* may explicitly signal UE 115-*a* to find system information (e.g., SIB1) of its master LTE base station 105-*b* (e.g., LTE cell or cell 205-*c*), in other cases, UE 115-*a* may be preconfigured to find system information (e.g., SIB1) of the LTE cell or cell 205-*c* (e.g., the indication from base station 105-*a* to measure and report CGI may trigger UE 115-*a* to find system information (e.g., SIB1) from the cell 205-*a* when UE 115-*a* has determined the SSB is off synchronization raster). The SIB1 of the master LTE base station or master cell 205-*c* may include CGI associated with the neighbor cell 205-*b*.

Figure 3:
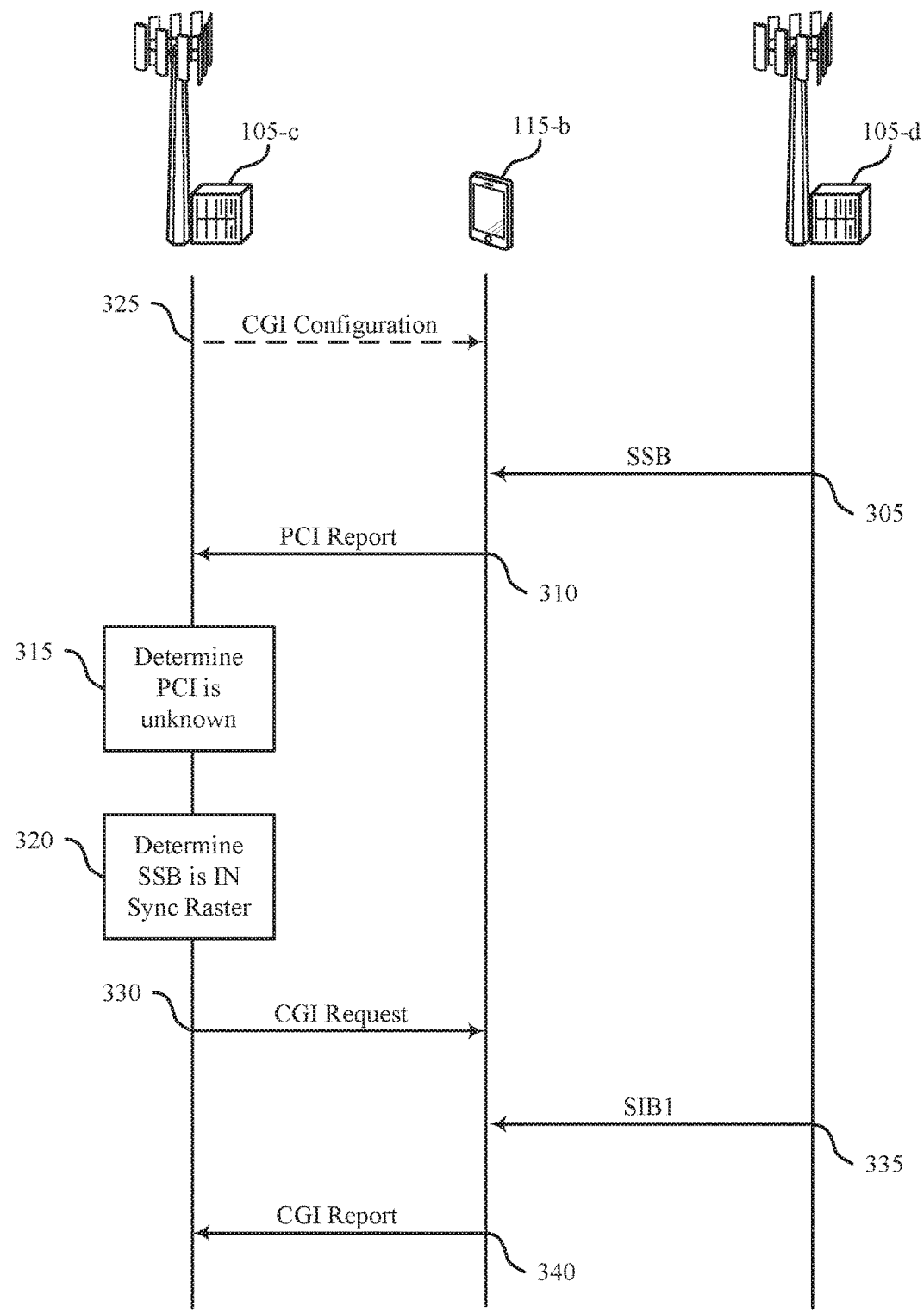
FIG. 3 illustrates an example of a process flow that supports measurement configuration for global cell identifier reporting in accordance with aspects of the present disclosure.

FIG. 3 illustrates an example of a process flow 300 that supports measurement configuration for global cell identifier reporting in accordance with aspects of the present disclosure. In some examples, process flow 300 may implement aspects of wireless communications system 100 and wireless communications system 200. Process flow 300 may include a first wireless node, a second wireless node, and a third wireless node. In some examples, the first wireless node may be a base station 105-*c*, the second wireless node may be a base station 105-*d*, and the third wireless node may be a UE 115-*b*, which may be examples of corresponding devices as described with reference to FIG. 1.

At 325, base station 105-*c* may optionally transmit a CGI configuration to UE 115-*b*. In some cases, CGI configuration may be transmitted to UE 115-*b* based on the determination that the SSB associated with the neighbor cell is in synchronization raster (e.g., the determination at 320). The CGI configuration may, in some cases, be conveyed to UE 115-*b* at some earlier time or may be preconfigured by the network. The CGI report may be configured via RRM signaling. In some cases, the CGI configuration (e.g., the CGI report configuration) may include cell and beam specific measurement and reporting configuration. For example, cell level measurement and reporting may be configured to be based on SSB, based on a RSRP, or a RSRQ, or a SINR, or any combination of these, etc. Further, beam level measurement and reporting may be based on SSB. Additionally, reporting types that may be configured include no reporting of beam level measurements, or beam index reporting, or beam index and beam layer 3 (L3) filtered RSRP/RSRQ/SINR reporting, or some combination of these.

At 305, UE 115-*b* may receive an SSB in a radio frequency band of a neighbor cell of base station 105-*d* (e.g., a neighbor base station). In some cases, the SSB may be an SSB of an SS burst (e.g., a series of SSBs transmitted in a beamsweeping manner) transmitted by base station 105-*d*.

At 310, UE 115-*b* may report PCI for the neighbor cell to base station 105-*c* (e.g., a serving base station). The reported neighbor cell PCI may be determined based on the SSB received at 305 (e.g., the neighbor cell PCI may be determined by decoding PSS/SSS of the received SSB).

At 315, base station 105-*c* may determine the PCI received at 310 is unknown (e.g., base station 105-*c* may determine the PCI received in a measurement report transmitted by UE 115-*b* at 310 is not associated with an entry on a neighbor list maintained by base station 105-*c*).

At 320, base station 105-*c* may determine a frequency location associated with the measurement report (e.g., the SSB received at 305 by UE 115-*b*) is in synchronization raster (e.g., the frequency location associated with the measurement report is within a synchronization raster of the UE 115-*b*). For example, base station 105-*c* may identify a measID information element included in the measurement report received at 310. The measID may indicate a frequency location, which may inform the base station 105-*c* or allow base station 105-*c* to determine whether the SSB is located in or off the synchronization raster. In the present example, the base station 105-*c* may determine that the SSB is in the synchronization raster.

At 330, base station 105-*c* may instruct UE 115-*b* to report CGI for base station 105-*d* (e.g., at 330, base station 105-*c* may determine to instruct UE 115-*b* to report CGI associated with the neighbor cell). In some cases, the determination to instruct UE 115-*b* to report CGI associated with the neighbor cell may be based on the determination that the SSB associated with the neighbor cell is in synchronization raster (e.g., the determination at 320).

At 335, UE 115-*b* may receive system information (e.g., system information, such as a SIB associated with the first SSB) from base station 105-*d*. The UE 115-*b* may identify CGI based on the received system information. In cases where the SSB is in synchronization raster, the system information received and used to identify CGI may include, in some cases, a SIB (e.g., SIB1) associated with the SSB (e.g., upon receiving report CGI instructions at 330, UE 115-*b* may directly find SIB1 associated with the SSB). In other cases, the UE 115-*b* may find SIB1 in another SSB indicated by the SSB received at 305 (e.g., SSB may occasionally include or be broadcast with SIB1, and in cases where the SSB received at 305 does not include SIB1, the SSB received at 305 may indicate an SSB that does include SIB1).

For example, UE 115-*b* may determine that system information is not associated with the first SSB (e.g., the SSB received at 305), and may receive a second SSB where the second SSB (e.g., timing information associated with the second SSB) is indicated at least in part by the first SSB. In such cases, 335 may include receiving, from base station 105-*d*, system information associated with the second SSB (e.g., where the second SSB is received based at least in part on the first SSB). The UE 115-*b* may identify the CGI based on the system information identified in the second SSB.

At 340, UE 115-*b* may transmit the CGI to base station 105-*c* (e.g., the serving base station). In some cases, the CGI may be transmitted in a CGI report or a measurement report (e.g., and may include information as configured by a received CGI configuration in cases where a CGI configuration is received at 325).

Figure 4:
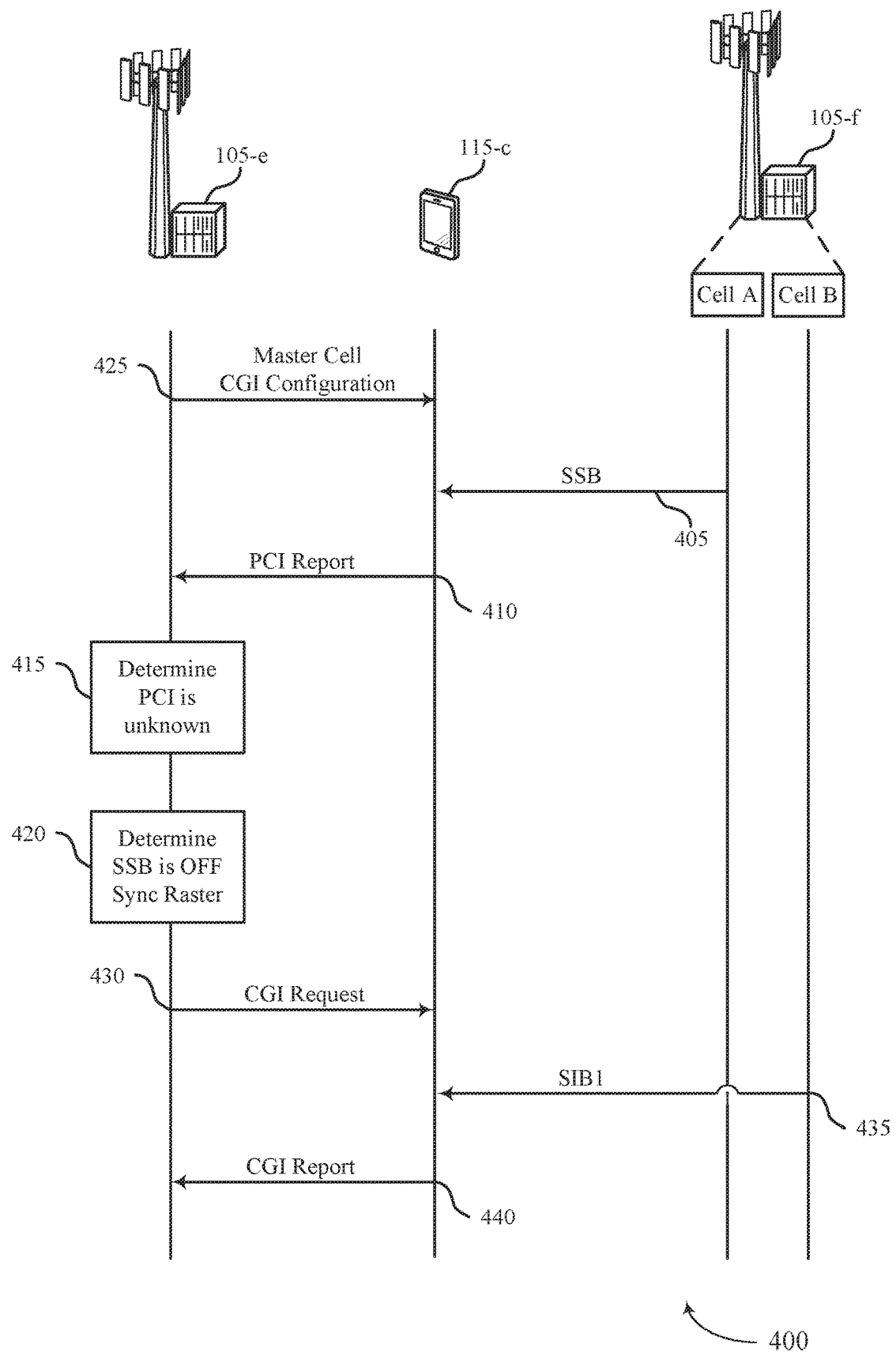
FIG. 4 illustrates an example of a process flow that supports measurement configuration for global cell identifier reporting in accordance with aspects of the present disclosure.

FIG. 4 illustrates an example of a process flow 400 that supports measurement configuration for global cell identifier reporting in accordance with aspects of the present disclosure. In some examples, process flow 400 may implement aspects of wireless communications system 100 and wireless communications system 200. Process flow 400 may include a first wireless node, a second wireless node, and a third wireless node. In some examples, the first wireless node may be a base station 105-*e*, the second wireless node may be a base station 105-*f*, and the third wireless node may be a UE 115-*c*, which may be examples of corresponding devices as described with reference to FIG. 1.

At 425, base station 105-*e* may transmit a master cell CGI reporting configuration to UE 115-*c* (e.g., at 425, UE 115-*c* may receive an indication to determine system information associated with a second cell, Cell B or a master LTE cell, of the base station 105-*f*). In some cases, master cell CGI reporting configuration may be transmitted to UE 115-*c* based on the determination that the SSB associated with the neighbor cell is off synchronization raster (e.g., the determination at 420). The master cell CGI reporting configuration may, in some cases, be conveyed to UE 115-*c* at some earlier time or may be preconfigured by the network. The CGI reporting based on the master cell may be configured via RRM signaling. In some cases, the master cell CGI reporting configuration (e.g., the CGI report configuration) may include cell and beam specific measurement and reporting configuration. For example, cell level measurement and reporting may be configured to be based on SSB, based on RSRP/RSRQ/SINR, etc. Further, beam level measurement and reporting may be based on SSB. Additionally, reporting types that may be configured include no reporting of beam level measurements, or beam index reporting, or beam index and beam L3 filtered RSRP/RSRQ/SINR reporting, etc.

At 405, UE 115-*c* may receive an SSB in a radio frequency band of a neighbor cell (e.g., Cell A, or an NR cell) of base station 105-*f* (e.g., a neighbor base station). In some cases, the SSB may be an SSB of an SS burst (e.g., a series of SSBs transmitted in a beamsweeping manner) transmitted by base station 105-*f* In some cases UE 115-*c* may receive multiple SSBs, for example two or more of the SSBs of an SS burst, and report information (e.g., selectively) from one or more of the SSBs.

At 410, UE 115-*c* may report PCI for the neighbor Cell A (e.g., an NR cell) to base station 105-*e* (e.g., a serving base station). The reported neighbor Cell A PCI may be determined based on the SSB received at 405 (e.g., the neighbor cell A PCI may be determined by decoding the PSS and SSS of the received SSB).

At 415, base station 105-*e* may determine the PCI received at 410 is unknown (e.g., base station 105-*e* may determine the PCI received in a measurement report transmitted by UE 115-*c* at 410 is not associated with an entry on a neighbor list maintained by base station 105-*e*).

At 420, base station 105-*e* may determine a frequency location associated with the measurement report (e.g., the SSB received at 405 by UE 115-*c*) is off synchronization raster (e.g., the frequency location associated with the measurement report is off or not included in a synchronization raster of the UE 115-*c*). For example, base station 105-*e* may identify a measID included in the measurement report received at 410. The measID may indicate a frequency location, which may inform the base station 105-*e* as to whether the SSB is located in or off the synchronization raster. In the present example, the base station 105-*e* may determine that the SSB is off the synchronization raster.

At 430, base station 105-*e* may instruct UE 115-*c* to report CGI for base station 105-*f* (e.g., at 430, base station 105-*e* may determine to instruct UE 115-*c* to report CGI associated with the neighbor cell). In some cases, the determination to instruct UE 115-*c* to report CGI associated with the neighbor cell may be based on the determination that the SSB associated with the neighbor cell is off synchronization raster (e.g., the determination at 420). In some cases, the master cell CGI reporting configuration may be the instruction for UE 115-*c* to report CGI for Cell B of base station 105-*f* (e.g., 425 and 430 may not be two separate transmissions or messages, but may be a single transmission or message, such as the master cell CGI reporting configuration may instruct the UE 115-*c* to measure and report CGI of Cell B).

At 435, UE 115-*c* may receive system information (e.g., system information associated with the Cell B) from base station 105-*f* (e.g., based on the master cell CGI report configuration received at 425). The UE 115-*c* may identify CGI based on the received system information. For example, the system information associated with Cell B may, in some cases, include CGI for Cell A. In some cases, a SIB1 associated with Cell B may be used (e.g., upon receiving report CGI instructions at 430, UE 115-*c* may directly find SIB1 associated with the Cell B) for determination of CGI associated with Cell A. The UE 115-*c* may identify the CGI associated with Cell A based on the system information identified in the system information (e.g., SIB1) associated with Cell B.

At 440, UE 115-*c* may transmit the CGI (e.g., associated with Cell A) to base station 105-*e* (e.g., the serving base station). In some cases, the CGI may be transmitted (e.g., reported) in a CGI report or a measurement report (e.g., and may include information as configured by a received CGI configuration in cases where a CGI configuration is received at 425).

Figure 5:
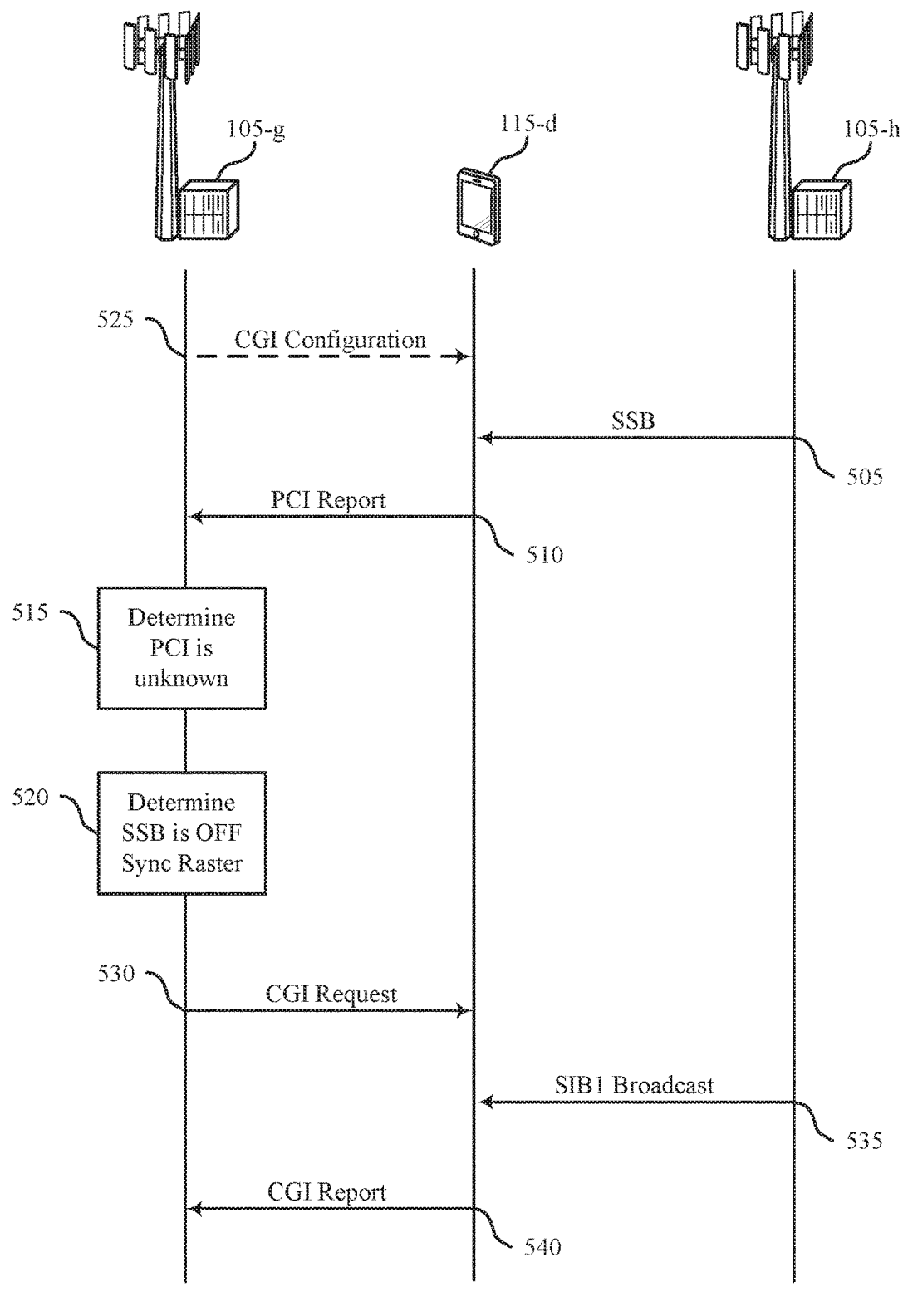
FIG. 5 illustrates an example of a process flow that supports measurement configuration for global cell identifier reporting in accordance with aspects of the present disclosure.

FIG. 5 illustrates an example of a process flow 500 that supports measurement configuration for global cell identifier reporting in accordance with aspects of the present disclosure. In some examples, process flow 500 may implement aspects of wireless communications system 100 and wireless communications system 200. Process flow 500 may include a first wireless node, a second wireless node, and a third wireless node. In some examples, the first wireless node may be a base station 105-*g*, the second wireless node may be a base station 105-*h*, and the third wireless node may be a UE 115-*d*, which may be examples of corresponding devices as described with reference to FIG. 1.

At 525, base station 105-*g* may optionally transmit a CGI configuration to UE 115-*d*. In some cases, CGI configuration may be transmitted to UE 115-*d* based on the determination that the SSB associated with the neighbor cell is off synchronization raster (e.g., the determination at 520). The CGI configuration may, in some cases, be conveyed to UE 115-*d* at some earlier time or may be preconfigured by the network. The CGI report may be configured via RRM signaling. In some cases, the CGI configuration (e.g., the CGI report configuration) may include cell and beam specific measurement and reporting configuration. For example, cell level measurement and reporting may be configured to be based on SSB, based on RSRP/RSRQ/SINR, etc. Further, beam level measurement and reporting may be based on SSB. Additionally, reporting types that may be configured include no reporting of beam level measurements, beam index reporting, beam index and beam L3 filtered RSRP/RSRQ/SINR reporting, etc.

At 505, UE 115-*d* may receive an SSB in a radio frequency band of a neighbor cell of base station 105-*h* (e.g., a neighbor base station). In some cases, the SSB may be an SSB of an SS burst (e.g., a series of SSBs transmitted in a beamsweeping manner) transmitted by base station 105-*h*.

At 510, UE 115-*d* may report PCI for the neighbor cell to base station 105-*g* (e.g., a serving base station). The reported neighbor cell PCI may be determined based on the SSB received at 505 (e.g., the neighbor cell PCI may be determined by decoding the PSS and SSS of the received SSB).

At 515, base station 105-*g* may determine the PCI received at 510 is unknown (e.g., base station 105-*g* may determine the PCI received in a measurement report transmitted by UE 115-*d* at 510 is not associated with an entry on a neighbor list maintained by base station 105-*g*).

At 520, base station 105-*g* may determine a frequency location associated with the measurement report (e.g., the SSB received at 505 by UE 115-*d*) is off synchronization raster (e.g., the frequency location associated with the measurement report is off or not included in a synchronization raster of the UE 115-*d*). For example, base station 105-*g* may identify a measID included in the measurement report received at 510. The measID may indicate a frequency location, which may inform the base station 105-*g* as to whether the SSB is located in or off the synchronization raster. In the present example, the base station 105-*g* may determine that the SSB is off the synchronization raster.

At 530, base station 105-*g* may instruct UE 115-*d* to report CGI for base station 105-*h* (e.g., at 530, base station 105-*g* may determine to instruct UE 115-*d* to report CGI associated with the neighbor cell). In some cases, the determination to instruct UE 115-*d* to report CGI associated with the neighbor cell may be based on the determination that the SSB associated with the neighbor cell is off synchronization raster (e.g., the determination at 520).

At 535, UE 115-*d* may receive system information (e.g., system information associated with the first SSB) from base station 105-*h* in a CGI broadcast transmission. That is, cells (e.g., a neighbor cell associated with base station 105-*h*) may broadcast global cell IDs (e.g., CGI) in a sparse transmission pattern. In some cases, the global cell ID may be separated into segments to enhance detection robustness (e.g., in some cases, CGI may be separated into segments and broadcast over several CGI broadcast transmissions). The transmission pattern of the CGI broadcast transmissions may be derived (e.g., by UE 115-*d*) from SSB received at 505. For example, the SSB received by UE 115-*d* at 505 may include a timing reference, or may act as a timing reference, of always-on transmission pattern of global cell ID. That is, when the SSB at 505 is determined to be off synchronization raster, UE 115-*d* may determine a timing reference through the SIB received at 505, and may wait for the broadcast global cell ID (e.g., and wait until 535 to receive the broadcast CGI). The UE 115-*d* may identify CGI based on the received system information (e.g., the system information or the CGI received in the broadcast).

At 540, UE 115-*d* may transmit the CGI to base station 105-*g* (e.g., the serving base station). In some cases, the CGI may be transmitted in a CGI report or a measurement report (e.g., and may include information as configured by a received CGI configuration in cases where a CGI configuration is received at 525).

Figure 6:
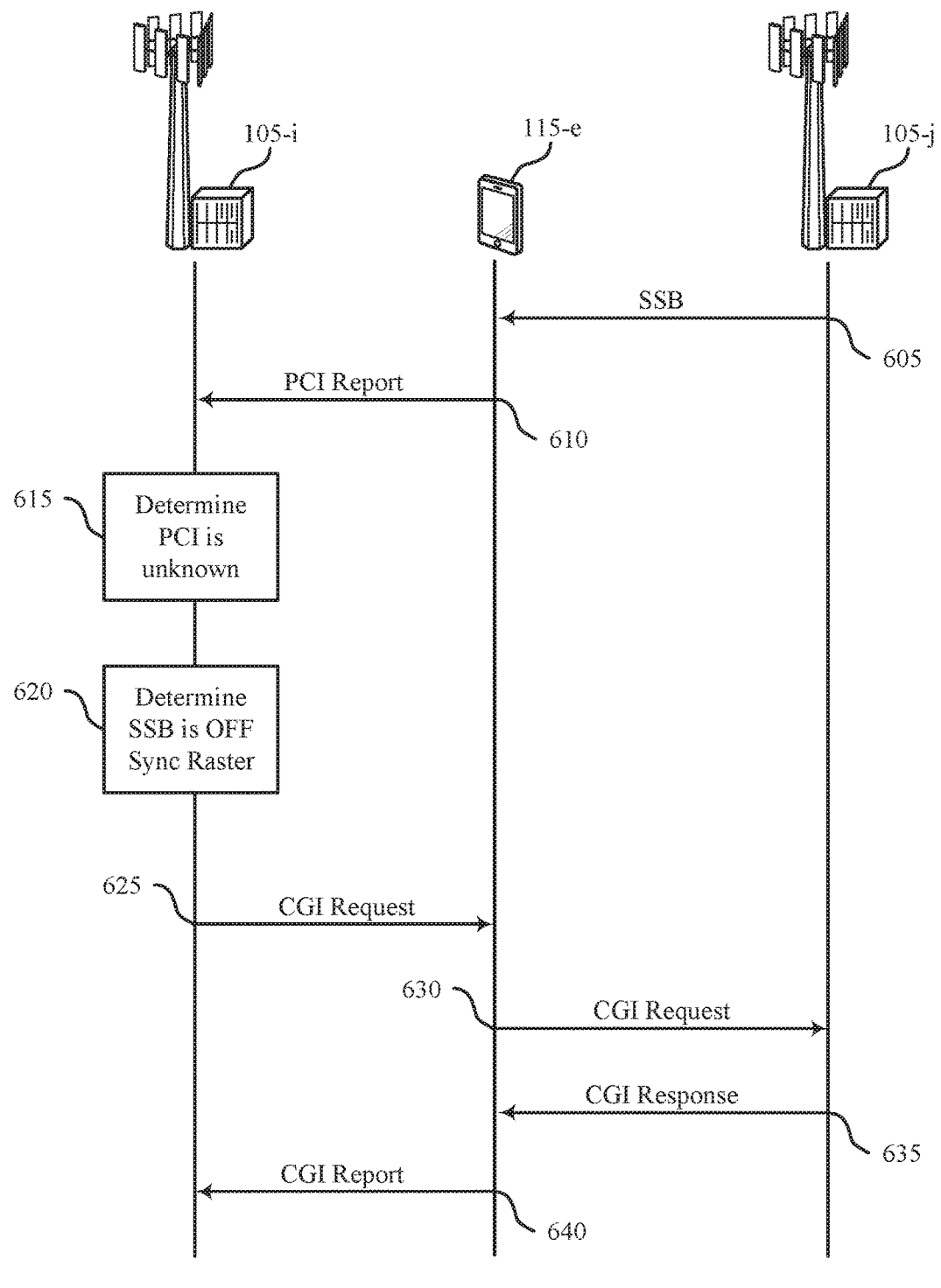
FIG. 6 illustrates an example of a process flow that supports measurement configuration for global cell identifier reporting in accordance with aspects of the present disclosure.

FIG. 6 illustrates an example of a process flow 600 that supports measurement configuration for global cell identifier reporting in accordance with aspects of the present disclosure. In some examples, process flow 600 may implement aspects of wireless communications system 100. Process flow 600 may include a first wireless node, a second wireless node, and a third wireless node. In some examples, the first wireless node may be a base station 105-*i*, the second wireless node may be a base station 105-*j*, and the third wireless node may be a UE 115-*e*, which may be examples of corresponding devices as described with reference to FIG. 1.

At 605, UE 115-e may receive an SSB in a radio frequency band of a neighbor cell of base station 105-j (e.g., a neighbor base station). In some cases, the SSB may be an SSB of an SS burst (e.g., a series of SSBs transmitted in a beamsweeping manner) transmitted by base station 105-j.

At 610, UE 115-e may report PCI for the neighbor cell to base station 105-i (e.g., a serving base station). The reported neighbor cell PCI may be determined based on the SSB received at 605 (e.g., the neighbor cell PCI may be determined by decoding the PSS and SSS of the received SSB).

At 615, base station 105-i may determine the PCI received at 610 is unknown (e.g., base station 105-i may determine the PCI received in a measurement report transmitted by UE 115-e at 610 is not associated with an entry on a neighbor list maintained by base station 105-i).

At 620, base station 105-i may determine a frequency location associated with the measurement report (e.g., the SSB received at 605 by UE 115-e) is off synchronization raster (e.g., the frequency location associated with the measurement report is off or not included in a synchronization raster of the UE 115-e). For example, base station 105-i may identify a measID included in the measurement report received at 610. The measID may indicate a frequency location, which may inform the base station 105-i as to whether the SSB is located in or off the synchronization raster. In the present example, the base station 105-i may determine that the SSB is off the synchronization raster.

At 625, base station 105-i may instruct UE 115-e to report CGI for base station 105-j (e.g., at 625, base station 105-i may request UE 115-e to report CGI associated with the neighbor cell). In some cases, the determination to instruct UE 115-e to report CGI associated with the neighbor cell may be based on the determination that the SSB associated with the neighbor cell is off synchronization raster (e.g., the determination at 620).

In some examples, wireless communications systems may enable on demand global cell ID acquisition. Dedicated uplink resources may be reserved for UEs (e.g., UE 115-e) to send requests for global cell ID acquisition (e.g., the dedicated uplink resources may be periodic and sparse). The dedicated uplink resources may be identified from SSB resources (e.g., SSB may be the timing reference, or may include timing information associated with uplink resources dedicated for CGI acquisition).

Further a two-step RACH procedure may be used. For example, at 630, UE 115-e may, based on the instruction received at 625, transmit a request for CGI. In some cases, 630 may refer to UE 115-e sending a RACH preamble, or in a Msg 1 (e.g., a request) in dedicated uplink resources. At 635, base station 105-j may respond by transmitting a global cell ID to the UE 115-e in a random access response, or in a Msg 2 (e.g., a response).

That is, if SSB received at 605 is off synchronization raster, UE 115-e may determine a timing reference (e.g., from the SSB) and wait for the dedicated uplink resources for global cell ID accordingly (e.g., the UE 115-e may wait for dedicated uplink resources, as indicated by the SSB, to use to transmit a CGI request). When the latest dedicated uplink resource arrives (e.g., at the timing resources associated with the dedicated up link resource), UE 115-e may transmit Msg 1 (e.g., a request) in dedicated uplink resource (e.g., at 630), and the base station 105-j may send CGI to the UE 115-e in Msg 2 (e.g., a response at 635).

At 640, UE 115-e may transmit (e.g., report) the CGI to base station 105-i (e.g., the serving base station). In some cases, the CGI may be transmitted in a CGI report or a measurement report.

Figure 7:
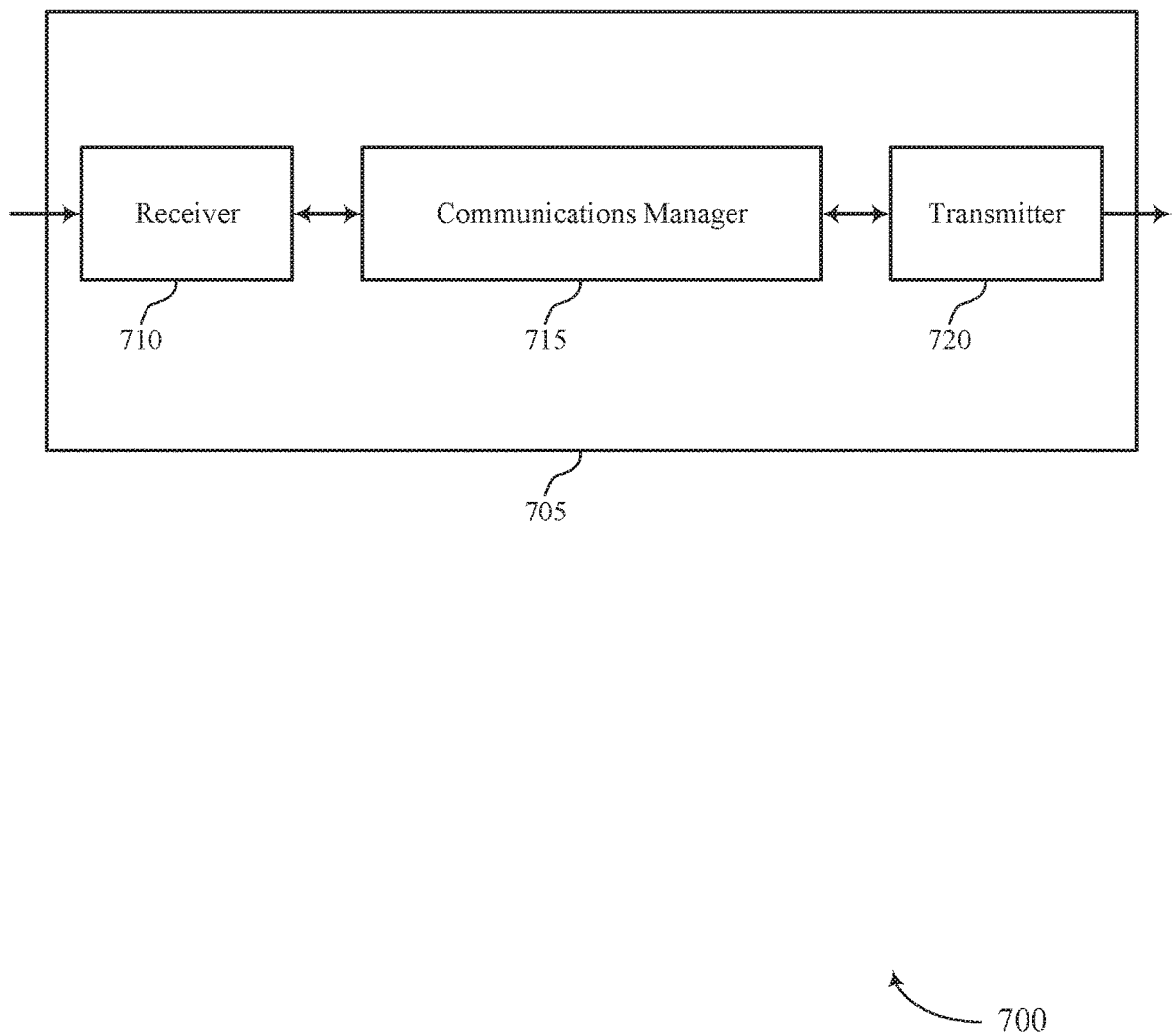
FIGS. 7 and 8 show block diagrams of devices that support measurement configuration for global cell identifier reporting in accordance with aspects of the present disclosure.

FIG. 7 shows a block diagram 700 of a device 705 that supports measurement configuration for global cell identifier reporting in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to measurement configuration for global cell identifier reporting, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a first SSB in a radio frequency band of a first cell of a second base station 105, report a PCI for the first cell to a first base station 105 based on the received first SSB, receive, from the first base station 105 in response to the reported PCI, an instruction to report a CGI for the second base station 105, and transmit the CGI to the first base station 105 based on the received instruction and whether the radio frequency band of the first SSB was received in a synchronization raster. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
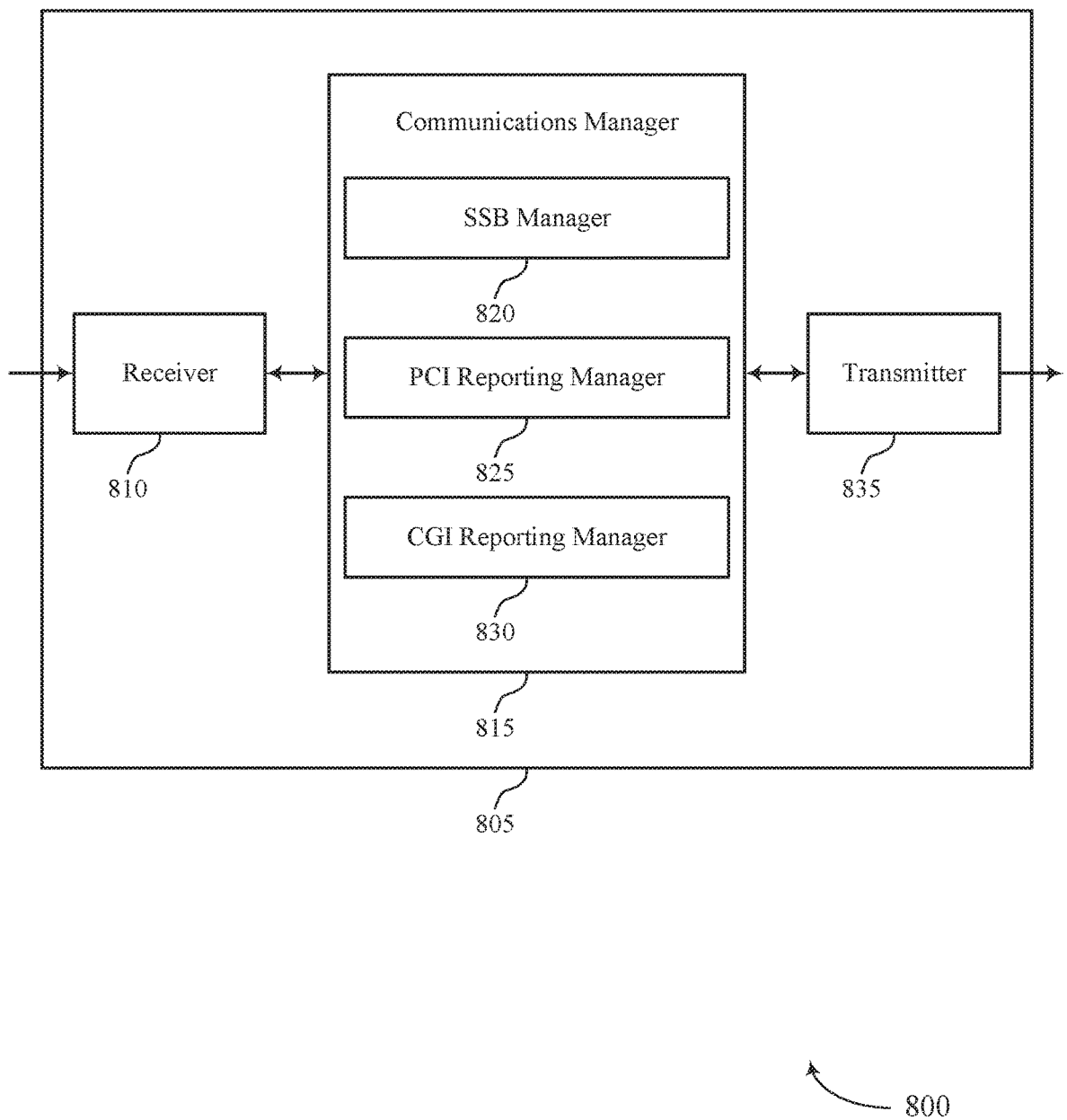

FIG. 8 shows a block diagram 800 of a device 805 that supports measurement configuration for global cell identifier reporting in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to measurement configuration for global cell identifier reporting, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an SSB manager 820, a PCI reporting manager 825, and a CGI reporting manager 830. The communications manager 815 may be an example of aspects of the communications manager 1010 described herein. The SSB manager 820 may receive a first SSB in a radio frequency band of a first cell of a second base station 105. The PCI reporting manager 825 may report a PCI for the first cell to a first base station 105 based on the received first SSB.

The CGI reporting manager 830 may receive, from the first base station 105 in response to the reported PCI, an instruction to report a CGI for the second base station 105 and transmit the CGI to the first base station 105 based on the received instruction and whether the radio frequency band of the first SSB was received in a synchronization raster.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
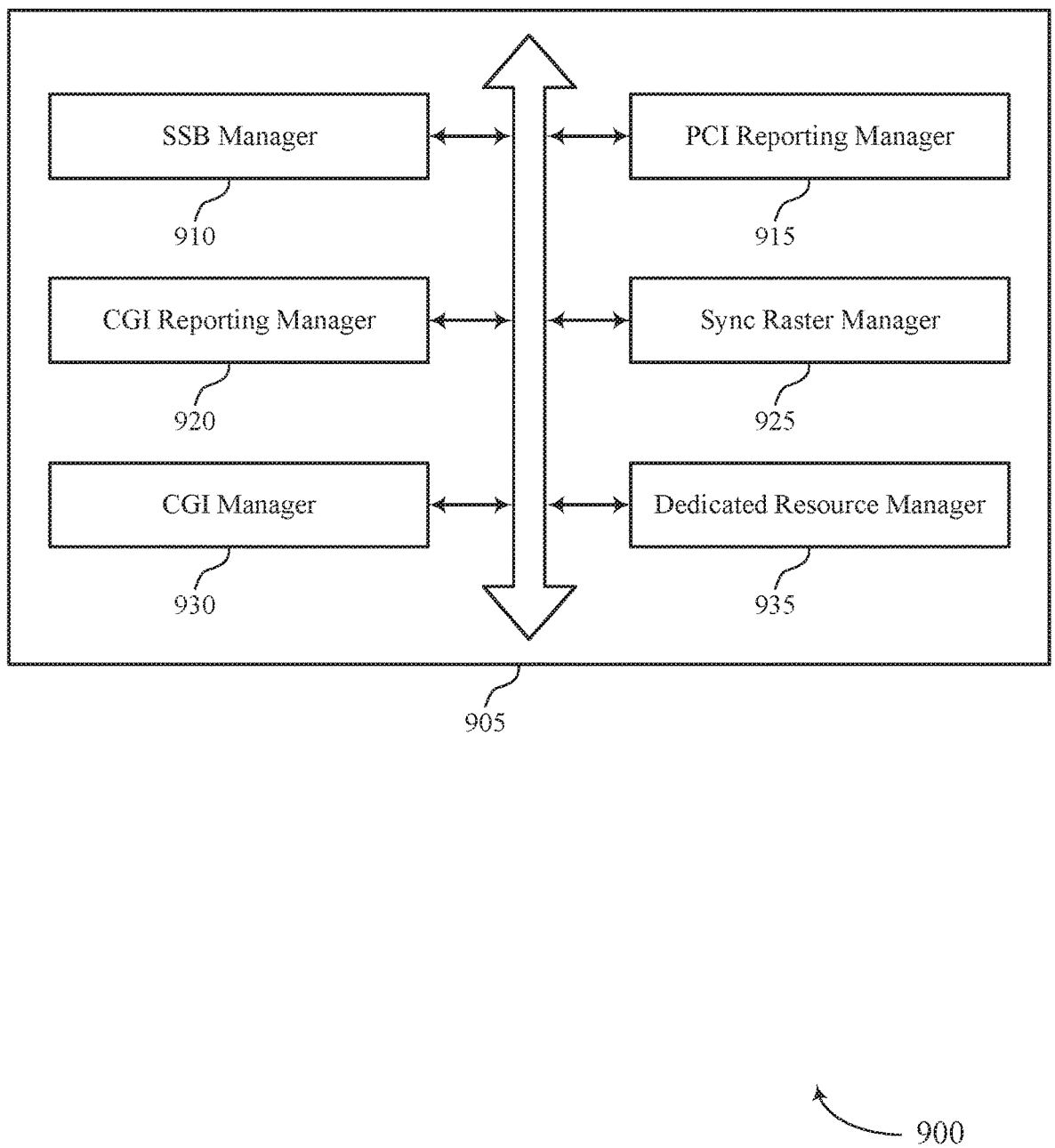
FIG. 9 shows a block diagram of a device that supports measurement configuration for global cell identifier reporting in accordance with aspects of the present disclosure.

FIG. 9 shows a block diagram 900 of a communications manager 905 that supports measurement configuration for global cell identifier reporting in accordance with aspects of the present disclosure. The communications manager 905 may be an example of aspects of a communications manager 715, a communications manager 815, or a communications manager 1010 described herein. The communications manager 905 may include an SSB manager 910, a PCI reporting manager 915, a CGI reporting manager 920, a synchronization raster manager 925, a CGI manager 930, and a dedicated resource manager 935. Each of these modules may communicate, directly or indirectly, with one another (e.g., via one or more buses).

The SSB manager 910 may receive a first SSB in a radio frequency band of a first cell of a second base station 105. In some examples, the SSB manager 910 may receive, from the second base station 105, system information associated with the first SSB. In some examples, the SSB manager 910 may receive, from the second base station 105, a second SSB where the second SSB is indicated at least in part by the first SSB. In some examples, the SSB manager 910 may receive, from the second base station 105, system information associated with the second SSB, where the second SSB is received based on the received first SSB. In some examples, the SSB manager 910 may determine system information is not associated with the first SSB. In some examples, the SSB manager 910 may determine a timing reference associated with a broadcast CGI based at least in part on the received first SSB.

The PCI reporting manager 915 may report a PCI for the first cell to a first base station 105 based on the received first SSB. In some examples, the PCI reporting manager 915 may transmit a measurement report that includes the PCI for the first cell and a measurement identifier associated with receiving the first SSB, where the instruction to report the CGI is based on the PCI and the measurement identifier. In some cases, the first base station 105 includes a serving base station 105. In some cases, the second base station 105 includes a neighboring base station 105.

The CGI reporting manager 920 may receive, from the first base station 105 in response to the reported PCI, an instruction to report a CGI for the second base station 105. In some examples, the CGI reporting manager 920 may transmit the CGI to the first base station 105 based on the received instruction and whether the radio frequency band of the first SSB was received in a synchronization raster. In some examples, the CGI reporting manager 920 may transmit the CGI to the first base station 105. In some cases, the instruction to report the CGI is transmitted by the first base station 105 is based on a determination, by the first base station 105, that the first SSB was received in the synchronization raster.

The synchronization raster manager 925 may determine, by the UE 115, that the first SSB was received in the synchronization raster. In some examples, the synchronization raster manager 925 may determine that system information is not associated with the first SSB. In some examples, the synchronization raster manager 925 may determine, by the UE 115, that the first SSB was received off the synchronization raster.

The CGI manager 930 may identify the CGI based on the system information. In some examples, the CGI manager 930 may receive an indication to determine system information associated with a second cell of the second base station 105. In some examples, the CGI manager 930 may receive, from the second base station 105, a broadcast CGI based on a transmission pattern associated with the timing reference. In some examples, the CGI manager 930 may identify the CGI based on the broadcast CGI. In some examples, the CGI manager 930 may parameters of the transmission pattern include a transmission periodicity and an offset. In some examples, the CGI manager 930 may parameters of the transmission pattern are obtained from system information. In some examples, the CGI manager 930 may transmit a CGI request in the dedicated resources based on a transmission pattern associated with the timing reference. In some examples, the CGI manager 930 may receive a first portion of the CGI in a first broadcast CGI message. In some examples, the CGI manager 930 may receive a second portion of the CGI in a second broadcast CGI message. In some examples, the CGI manager 930 may identify the CGI based on the first portion and the second portion. In some examples, the CGI manager 930 may identify a CGI broadcast pattern based one or more SSBs of a set of SSBs. In some examples, the CGI manager 930 may receive the CGI based on the identified CGI broadcast pattern. In some cases, the second cell includes a master LTE eNB of the second base station 105 operating in a non-standalone mode. In some cases, the CGI request is transmitted in a request of a random access procedure. In some cases, the CGI is received in a response of the random access procedure.

The dedicated resource manager 935 may determine a timing reference associated with dedicated resources for CGI at least in part based on the received first SSB. In some examples, the dedicated resource manager 935 may receive the CGI based on the transmitted CGI request. In some examples, the dedicated resource manager 935 may parameters of a transmission pattern of the dedicated resources for CGI include a transmission periodicity and an offset. In some examples, the dedicated resource manager 935 may parameters of a transmission pattern of the dedicated resources for CGI are obtained from system information.

Figure 10:
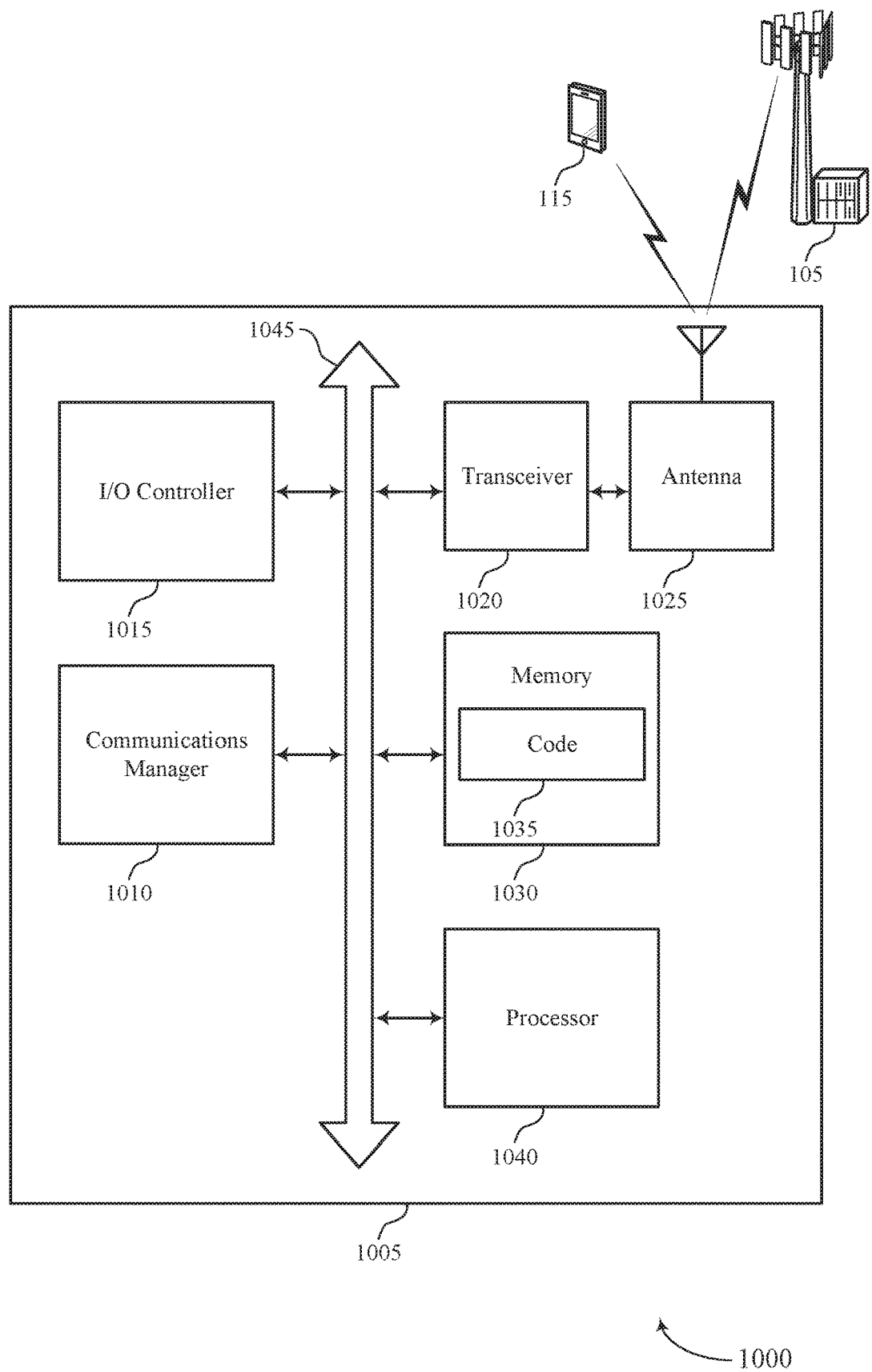
FIG. 10 shows a diagram of a system including a device that supports measurement configuration for global cell identifier reporting in accordance with aspects of the present disclosure.

FIG. 10 shows a diagram of a system 1000 including a device 1005 that supports measurement configuration for global cell identifier reporting in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a first SSB in a radio frequency band of a first cell of a second base station 105, report a PCI for the first cell to a first base station 105 based on the received first SSB, receive, from the first base station 105 in response to the reported PCI, an instruction to report a CGI for the second base station 105, and transmit the CGI to the first base station 105 based on the received instruction and whether the radio frequency band of the first SSB was received in a synchronization raster.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device 1005 may include a single antenna 1025. However, in some cases the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting measurement configuration for global cell identifier reporting).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
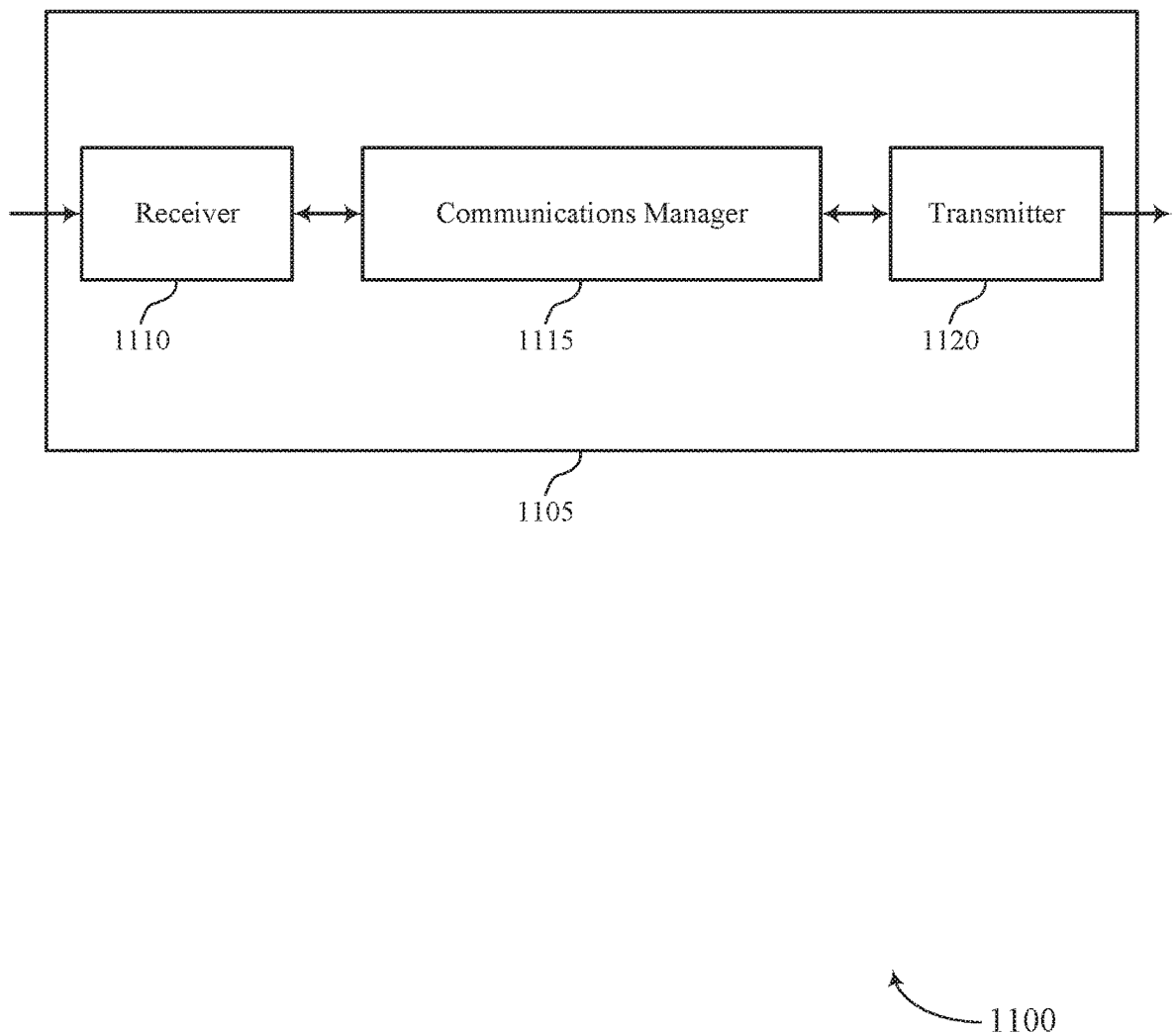
FIGS. 11 and 12 show block diagrams of devices that support measurement configuration for global cell identifier reporting in accordance with aspects of the present disclosure.

FIG. 11 shows a block diagram 1100 of a device 1105 that supports measurement configuration for global cell identifier reporting in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to measurement configuration for global cell identifier reporting, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a UE 115, a PCI for a first cell of a second base station 105, identify whether a radio frequency band of a first SSB used to identify the PCI was received in a synchronization raster, and determine whether to instruct the UE 115 to report a CGI for the second base station 105 based on the identification. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
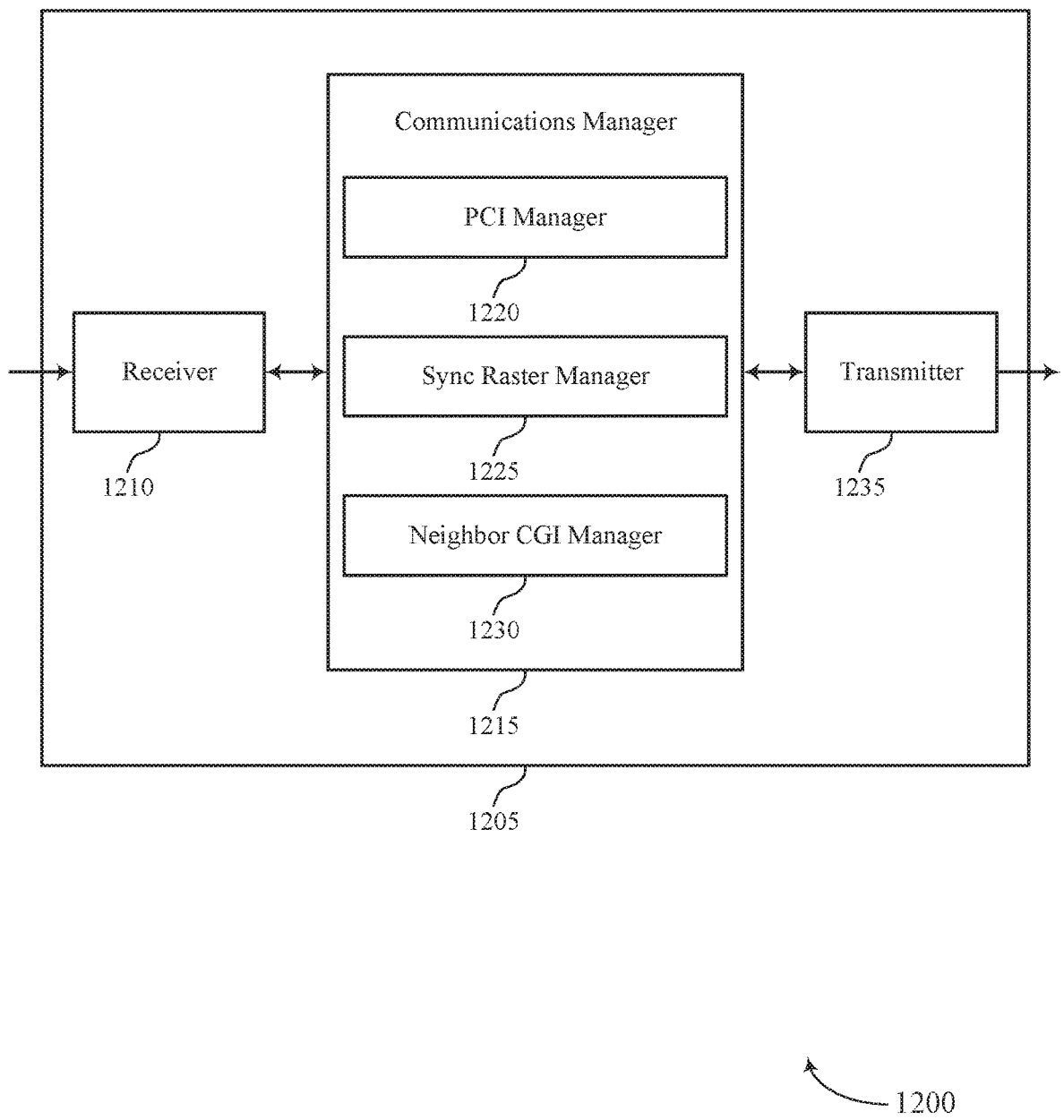

FIG. 12 shows a block diagram 1200 of a device 1205 that supports measurement configuration for global cell identifier reporting in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to measurement configuration for global cell identifier reporting, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a PCI manager 1220, a synchronization raster manager 1225, and a neighbor CGI manager 1230. The communications manager 1215 may be an example of aspects of the communications manager 1410 described herein.

The PCI manager 1220 may receive, from a UE 115, a PCI for a first cell of a second base station 105. The synchronization raster manager 1225 may identify whether a radio frequency band of a first SSB used to identify the PCI was received in a synchronization raster. The neighbor CGI manager 1230 may determine whether to instruct the UE 115 to report a CGI for the second base station 105 based on the identification.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
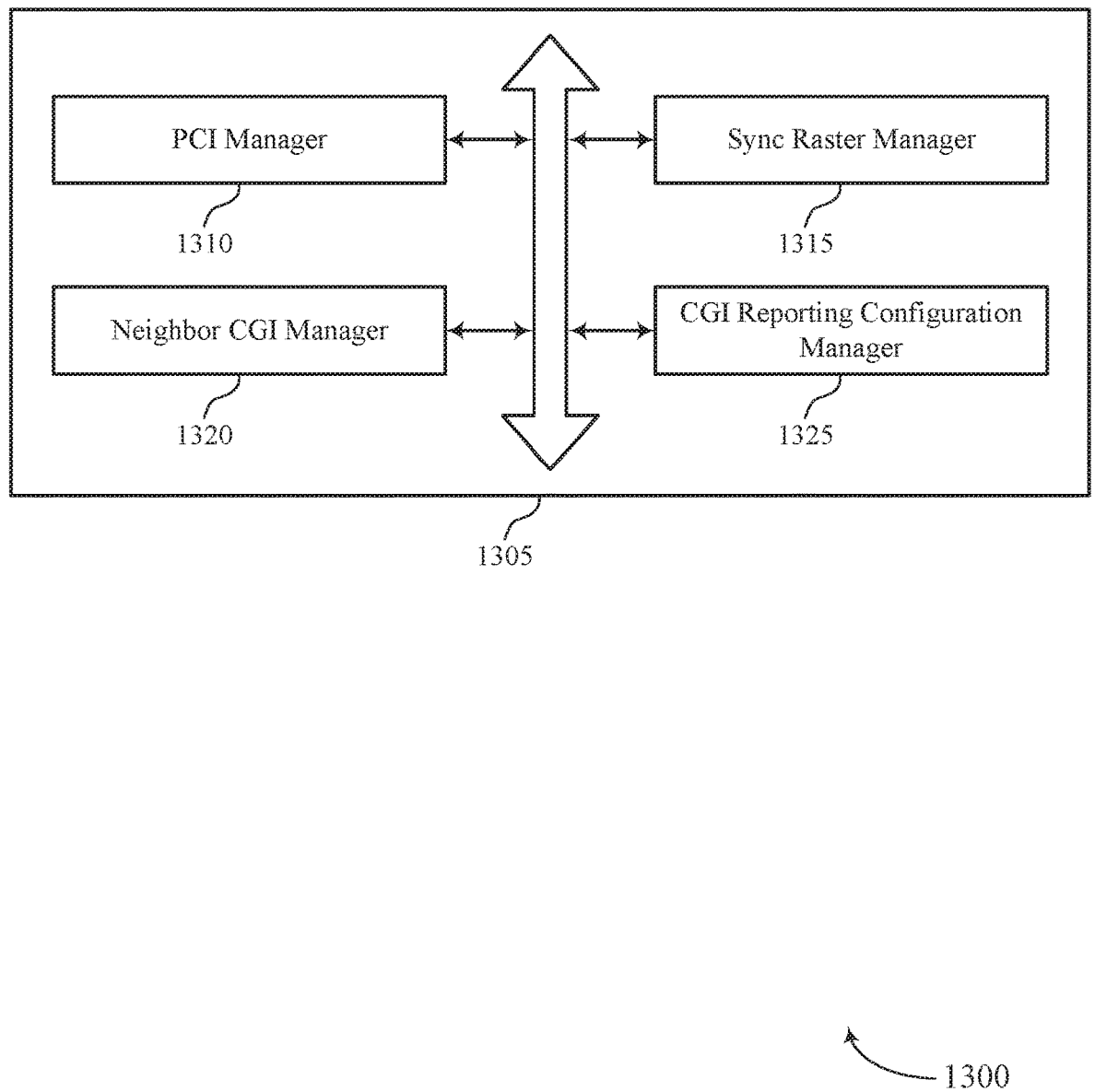
FIG. 13 shows a block diagram of a device that supports measurement configuration for global cell identifier reporting in accordance with aspects of the present disclosure.

FIG. 13 shows a block diagram 1300 of a communications manager 1305 that supports measurement configuration for global cell identifier reporting in accordance with aspects of the present disclosure. The communications manager 1305 may be an example of aspects of a communications manager 1115, a communications manager 1215, or a communications manager 1410 described herein. The communications manager 1305 may include a PCI manager 1310, a synchronization raster manager 1315, a neighbor CGI manager 1320, and a CGI reporting configuration manager 1325. Each of these modules may communicate, directly or indirectly, with one another (e.g., via one or more buses).

The PCI manager 1310 may receive, from a UE 115, a PCI for a first cell of a second base station 105. In some cases, the second cell includes a master LTE eNB of the first base station 105 operating in a non-standalone mode. The synchronization raster manager 1315 may identify whether a radio frequency band of a first SSB used to identify the PCI was received in a synchronization raster.

The neighbor CGI manager 1320 may determine whether to instruct the UE 115 to report a CGI for the second base station 105 based on the identification. In some examples, the neighbor CGI manager 1320 may transmit an instruction for the UE 115 to report the CGI based on a determination that the first SSB was received in the synchronization raster. In some examples, the neighbor CGI manager 1320 may receive the CGI from the UE 115 based on the instruction. In some examples, the neighbor CGI manager 1320 may refrain from instructing the UE 115 to report the CGI based on a determination that the first SSB was received off the synchronization raster. In some examples, the neighbor CGI manager 1320 may transmit an instruction for the UE 115 to report the CGI based on a determination that the first SSB was received off the synchronization raster. In some examples, the neighbor CGI manager 1320 may receive the CGI from the UE 115 based on the transmitted instruction. In some examples, the neighbor CGI manager 1320 may receive the CGI from the UE 115 in response to the transmitted instruction. In some examples, the neighbor CGI manager 1320 may receive, from the UE 115, the CGI in a CGI report configured based on the transmitted CGI reporting configuration.

The CGI reporting configuration manager 1325 may transmit an instruction for the UE 115 to obtain system information from a second cell of the second base station 105 to identify the CGI. In some examples, the CGI reporting configuration manager 1325 may transmit a CGI reporting configuration to the UE 115. In some examples, the CGI reporting configuration manager 1325 may transmit a CGI reporting configuration to the UE 115 that indicates that the UE 115 is to measure and report cell level measurements. In some examples, the CGI reporting configuration manager 1325 may transmit a CGI reporting configuration to the UE 115 that indicates that the UE 115 is to measure and report beam level measurements. In some cases, the beam level measurements include a beam identifier. In some cases, the beam level measurements include a beam quality. In some cases, the beam level measurements include a beam identifier and beam quality.

Figure 14:
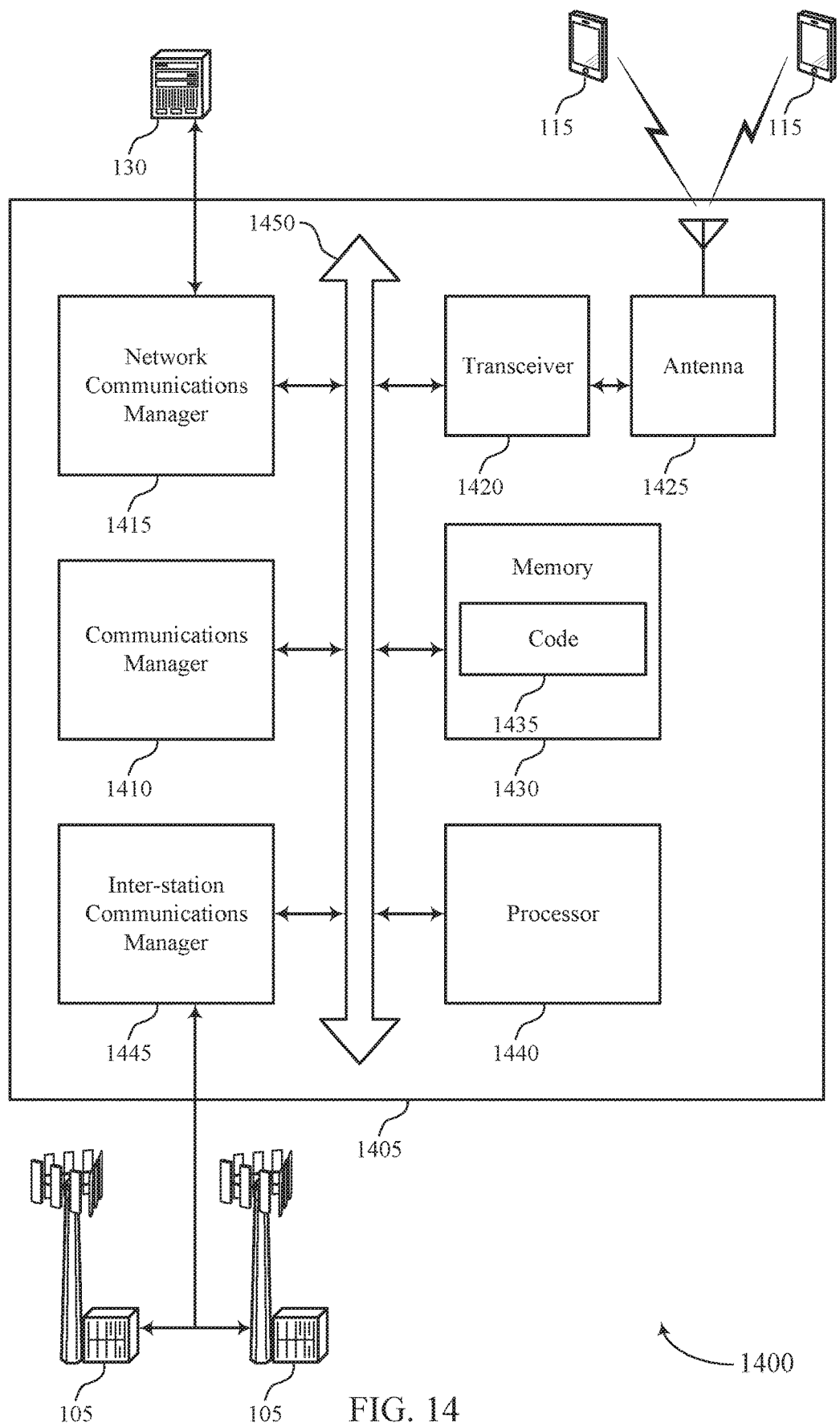
FIG. 14 shows a diagram of a system including a device that supports measurement configuration for global cell identifier reporting in accordance with aspects of the present disclosure.

FIG. 14 shows a diagram of a system 1400 including a device 1405 that supports measurement configuration for global cell identifier reporting in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive, from a UE 115, a PCI for a first cell of a second base station 105, identify whether a radio frequency band of a first SSB used to identify the PCI was received in a synchronization raster, and determine whether to instruct the UE to report a CGI for the second base station 105 based on the identification.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device 1405 may include a single antenna 1425. However, in some cases the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device 1405 to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting measurement configuration for global cell identifier reporting).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
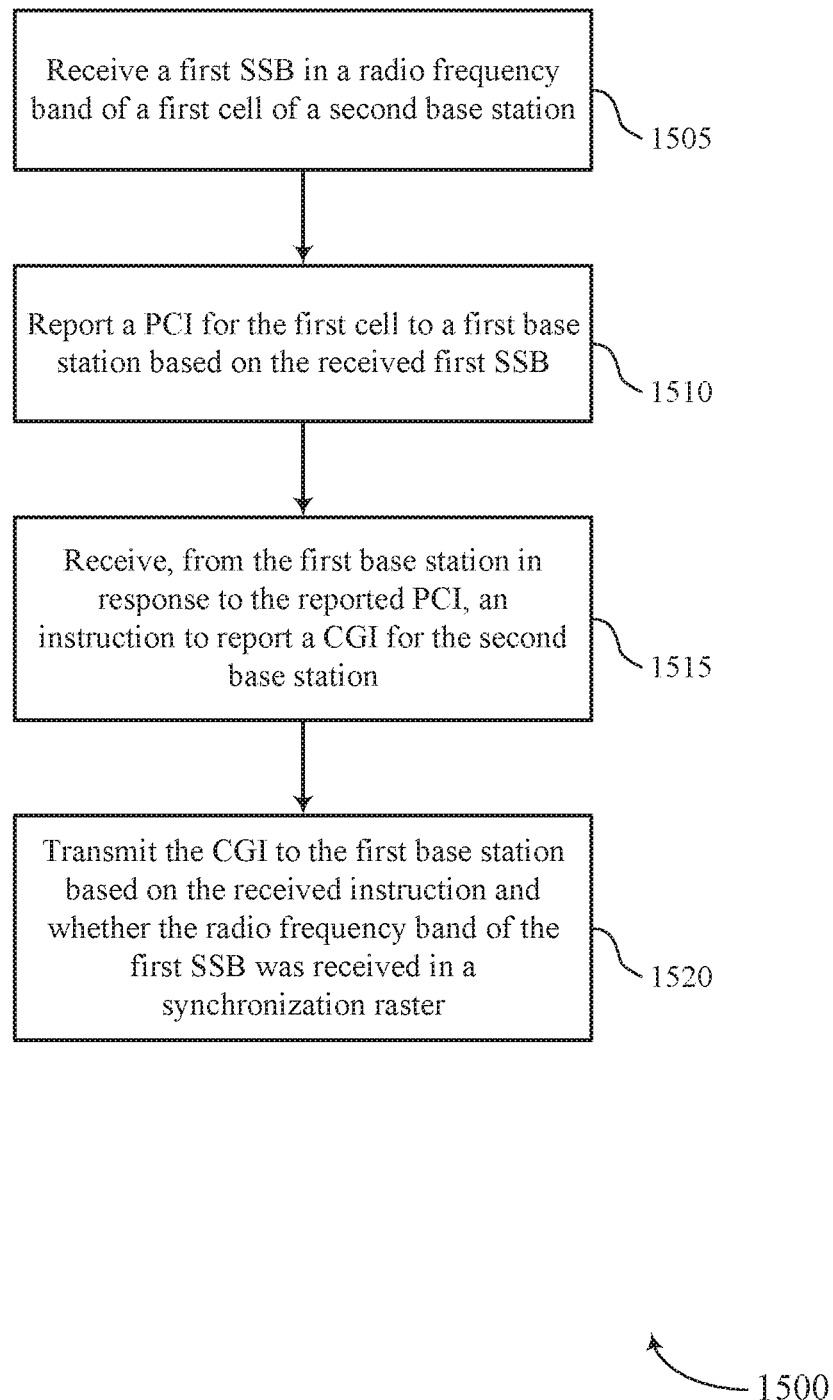
FIGS. 15 through 22 show flowcharts illustrating methods that support measurement configuration for global cell identifier reporting in accordance with aspects of the present disclosure.

FIG. 15 shows a flowchart illustrating a method 1500 that supports measurement configuration for global cell identifier reporting in accordance with aspects of the present disclosure. The operations of method 1500 may be implemented by a UE 115 or its components as described herein. For example, the operations of method 1500 may be performed by a communications manager as described with reference to FIGS. 7 to 10. In some examples, a UE 115 may execute a set of instructions to control the functional elements of the UE 115 to perform the functions described below. Additionally or alternatively, a UE 115 may perform aspects of the functions described below using special-purpose hardware.

At 1505, the UE 115 may receive a first SSB in a radio frequency band of a first cell of a second base station 105. The operations of 1505 may be performed according to the methods described herein. In some examples, aspects of the operations of 1505 may be performed by an SSB manager as described with reference to FIGS. 7 to 10.

At 1510, the UE 115 may report a PCI for the first cell to a first base station 105 based on the received first SSB. The operations of 1510 may be performed according to the methods described herein. In some examples, aspects of the operations of 1510 may be performed by a PCI reporting manager as described with reference to FIGS. 7 to 10.

At 1515, the UE 115 may receive, from the first base station 105 in response to the reported PCI, an instruction to report a CGI for the second base station 105. The operations of 1515 may be performed according to the methods described herein. In some examples, aspects of the operations of 1515 may be performed by a CGI reporting manager as described with reference to FIGS. 7 to 10.

At 1520, the UE 115 may transmit the CGI to the first base station 105 based on the received instruction and whether the radio frequency band of the first SSB was received in a synchronization raster. The operations of 1520 may be performed according to the methods described herein. In some examples, aspects of the operations of 1520 may be performed by a CGI reporting manager as described with reference to FIGS. 7 to 10.

Figure 16:
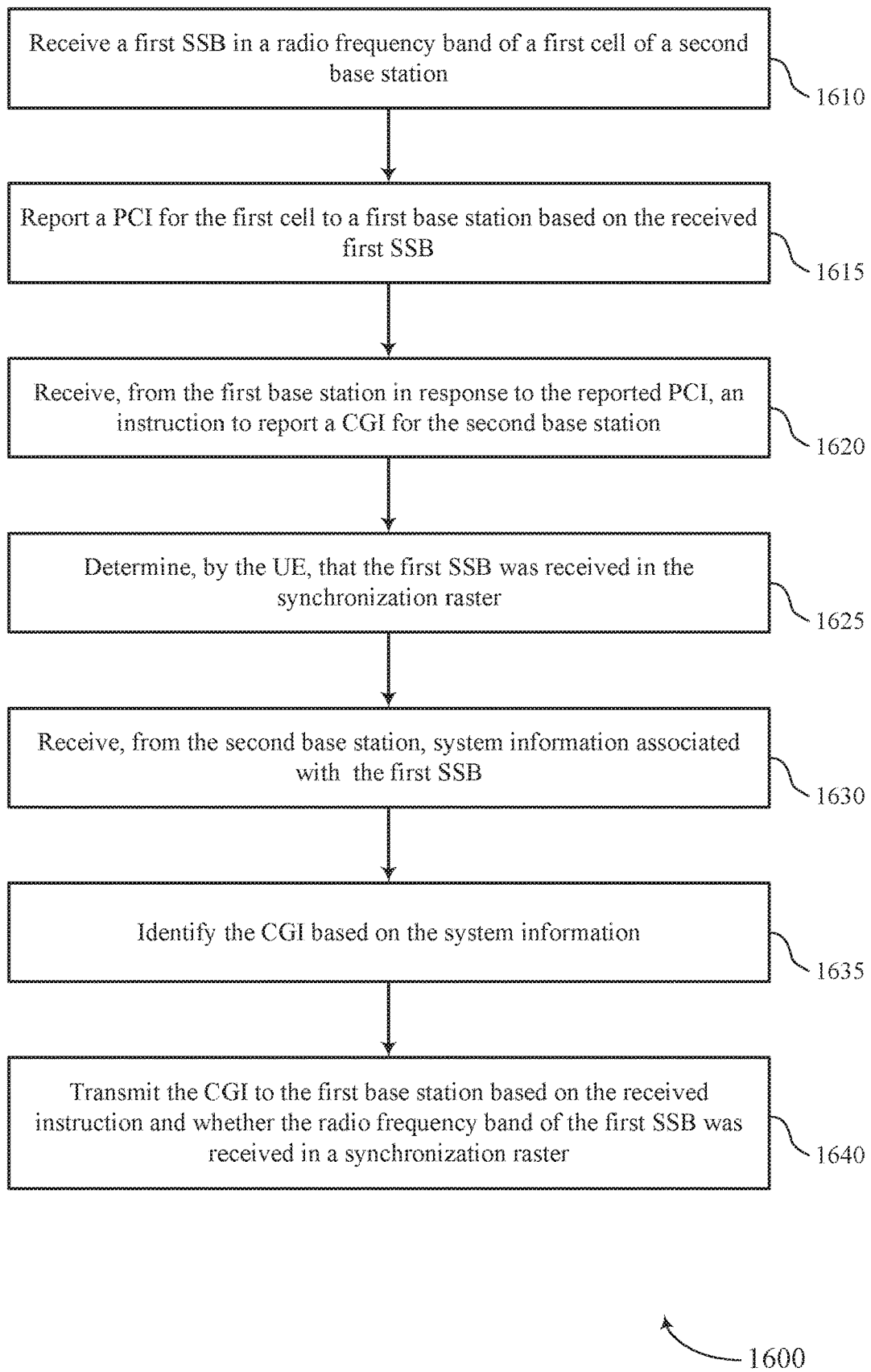

FIG. 16 shows a flowchart illustrating a method 1600 that supports measurement configuration for global cell identifier reporting in accordance with aspects of the present disclosure. The operations of method 1600 may be implemented by a UE 115 or its components as described herein. For example, the operations of method 1600 may be performed by a communications manager as described with reference to FIGS. 7 to 10. In some examples, a UE 115 may execute a set of instructions to control the functional elements of the UE 115 to perform the functions described below. Additionally or alternatively, a UE 115 may perform aspects of the functions described below using special-purpose hardware.

At 1610, the UE 115 may receive a first SSB in a radio frequency band of a first cell of a second base station 105. The operations of 1610 may be performed according to the methods described herein. In some examples, aspects of the operations of 1610 may be performed by an SSB manager as described with reference to FIGS. 7 to 10.

At 1615, the UE 115 may report a PCI for the first cell to a first base station 105 based on the received first SSB. The operations of 1615 may be performed according to the methods described herein. In some examples, aspects of the operations of 1615 may be performed by a PCI reporting manager as described with reference to FIGS. 7 to 10.

At 1620, the UE 115 may receive, from the first base station 105 in response to the reported PCI, an instruction to report a CGI for the second base station 105. The operations of 1620 may be performed according to the methods described herein. In some examples, aspects of the operations of 1620 may be performed by a CGI reporting manager as described with reference to FIGS. 7 to 10.

At 1625, the UE 115 may determine that the first SSB was received in the synchronization raster. The operations of 1625 may be performed according to the methods described herein. In some examples, aspects of the operations of 1625 may be performed by a synchronization raster manager as described with reference to FIGS. 7 to 10.

At 1630, the UE 115 may receive, from the second base station 105, system information associated with the first SSB. The operations of 1630 may be performed according to the methods described herein. In some examples, aspects of the operations of 1630 may be performed by an SSB manager as described with reference to FIGS. 7 to 10.

At 1635, the UE 115 may identify the CGI based on the system information. The operations of 1635 may be performed according to the methods described herein. In some examples, aspects of the operations of 1635 may be performed by a CGI manager as described with reference to FIGS. 7 to 10.

At 1640, the UE 115 may transmit the CGI to the first base station 105 based on the received instruction and whether the radio frequency band of the first SSB was received in a synchronization raster. The operations of 1640 may be performed according to the methods described herein. In some examples, aspects of the operations of 1640 may be performed by a CGI reporting manager as described with reference to FIGS. 7 to 10.

Figure 17:
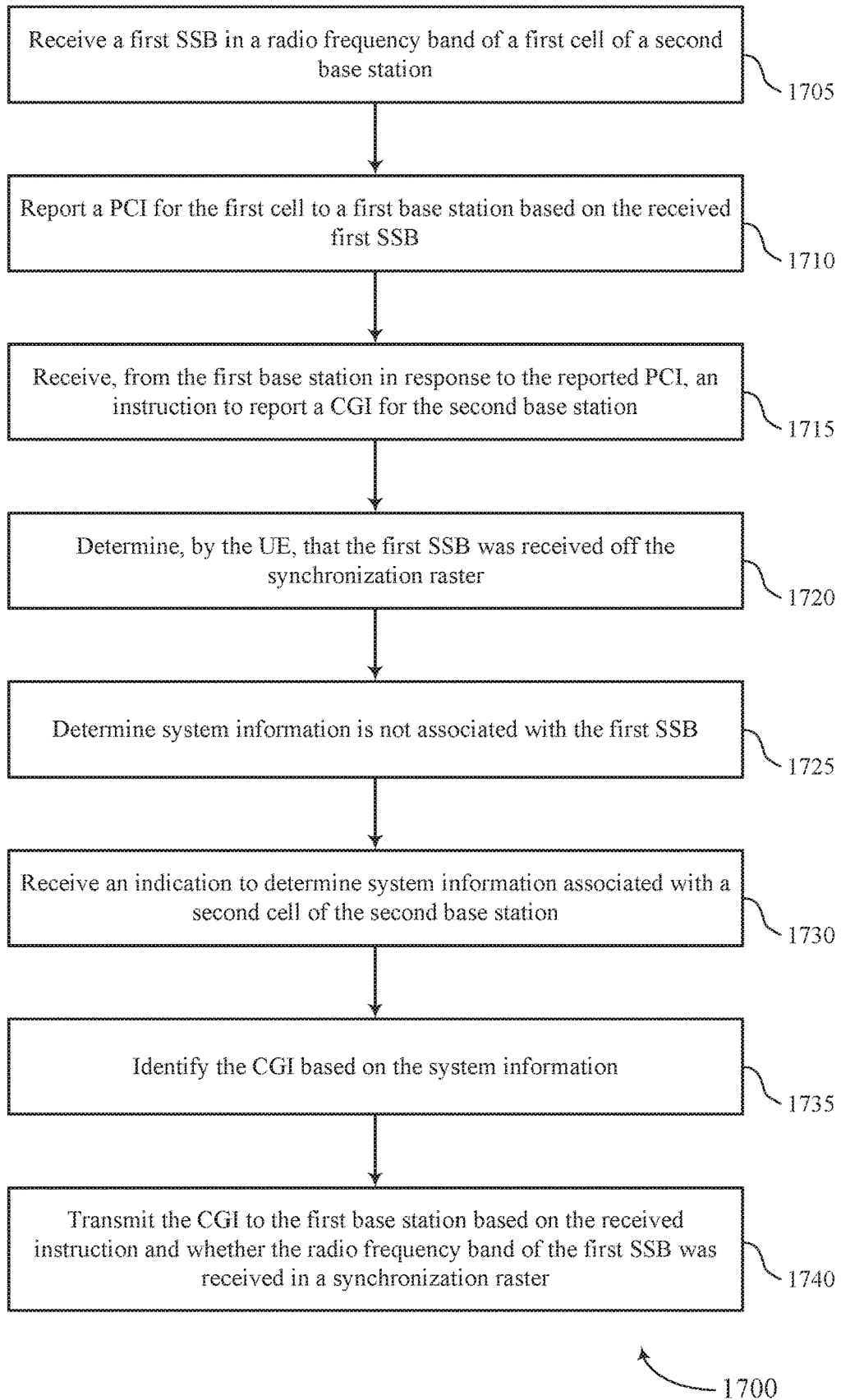

FIG. 17 shows a flowchart illustrating a method 1700 that supports measurement configuration for global cell identifier reporting in accordance with aspects of the present disclosure. The operations of method 1700 may be implemented by a UE 115 or its components as described herein. For example, the operations of method 1700 may be performed by a communications manager as described with reference to FIGS. 7 to 10. In some examples, a UE 115 may execute a set of instructions to control the functional elements of the UE 115 to perform the functions described below. Additionally or alternatively, a UE 115 may perform aspects of the functions described below using special-purpose hardware.

At 1705, the UE 115 may receive a first SSB in a radio frequency band of a first cell of a second base station 105. The operations of 1705 may be performed according to the methods described herein. In some examples, aspects of the operations of 1705 may be performed by an SSB manager as described with reference to FIGS. 7 to 10.

At 1710, the UE 115 may report a PCI for the first cell to a first base station 105 based on the received first SSB. The operations of 1710 may be performed according to the methods described herein. In some examples, aspects of the operations of 1710 may be performed by a PCI reporting manager as described with reference to FIGS. 7 to 10.

At 1715, the UE 115 may receive, from the first base station 105 in response to the reported PCI, an instruction to report a CGI for the second base station 105. The operations of 1715 may be performed according to the methods described herein. In some examples, aspects of the operations of 1715 may be performed by a CGI reporting manager as described with reference to FIGS. 7 to 10.

At 1720, the UE 115 may determine that the first SSB was received off the synchronization raster. The operations of 1720 may be performed according to the methods described herein. In some examples, aspects of the operations of 1720 may be performed by a synchronization raster manager as described with reference to FIGS. 7 to 10.

At 1725, the UE 115 may determine system information is not associated with the first SSB. The operations of 1725 may be performed according to the methods described herein. In some examples, aspects of the operations of 1725 may be performed by an SSB manager as described with reference to FIGS. 7 to 10.

At 1730, the UE 115 may receive an indication to determine system information associated with a second cell of the second base station 105. The operations of 1730 may be performed according to the methods described herein. In some examples, aspects of the operations of 1730 may be performed by a CGI manager as described with reference to FIGS. 7 to 10.

At 1735, the UE 115 may identify the CGI based on the system information. The operations of 1735 may be performed according to the methods described herein. In some examples, aspects of the operations of 1735 may be performed by a CGI manager as described with reference to FIGS. 7 to 10.

At 1740, the UE 115 may transmit the CGI to the first base station 105 based on the received instruction and whether the radio frequency band of the first SSB was received in a synchronization raster. The operations of 1740 may be performed according to the methods described herein. In some examples, aspects of the operations of 1740 may be performed by a CGI reporting manager as described with reference to FIGS. 7 to 10.

Figure 18:
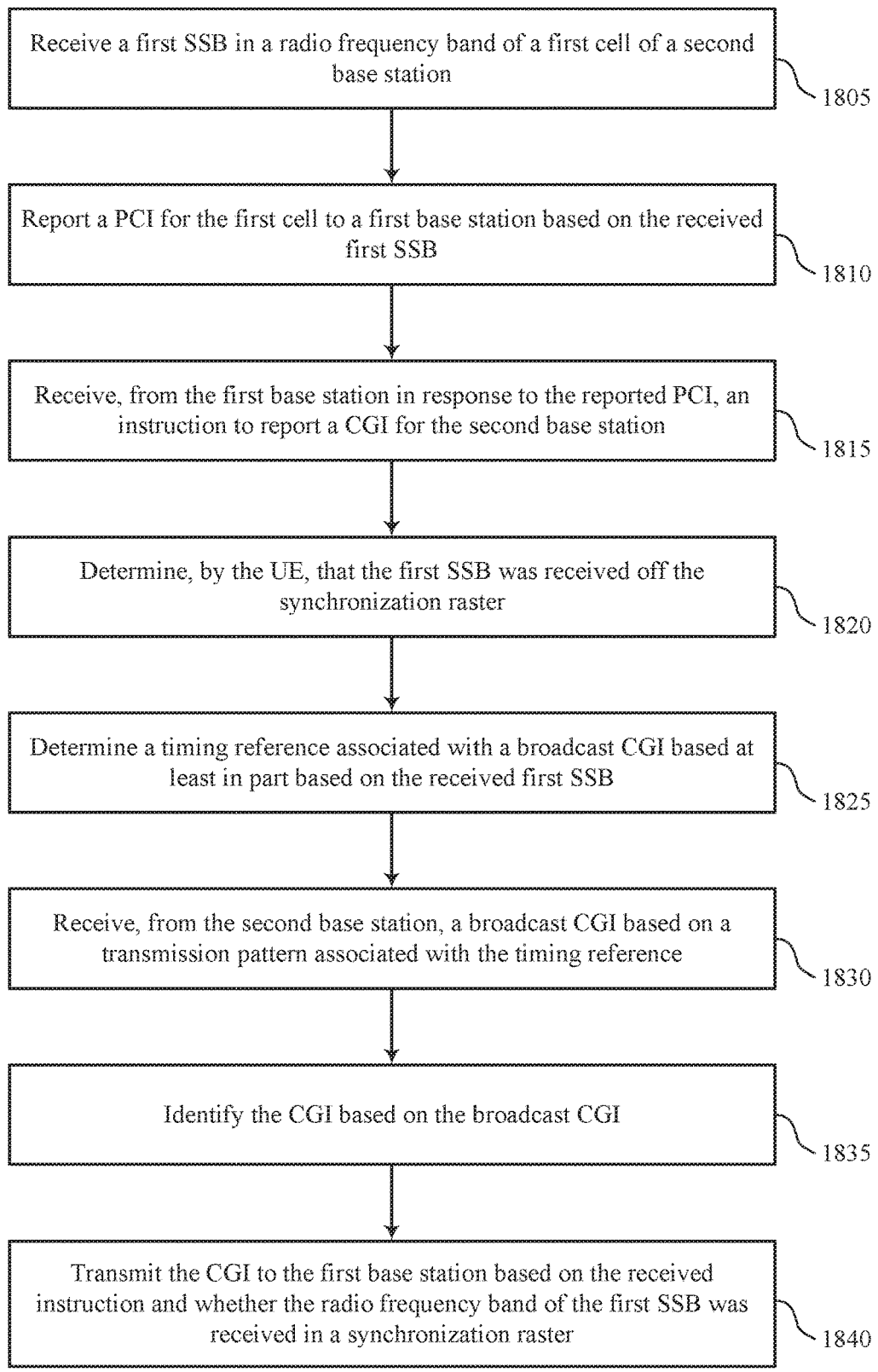

FIG. 18 shows a flowchart illustrating a method 1800 that supports measurement configuration for global cell identifier reporting in accordance with aspects of the present disclosure. The operations of method 1800 may be implemented by a UE 115 or its components as described herein. For example, the operations of method 1800 may be performed by a communications manager as described with reference to FIGS. 7 to 10. In some examples, a UE may execute a set of instructions to control the functional elements of the UE to perform the functions described below. Additionally or alternatively, a UE may perform aspects of the functions described below using special-purpose hardware.

At 1805, the UE 115 may receive a first SSB in a radio frequency band of a first cell of a second base station 105. The operations of 1805 may be performed according to the methods described herein. In some examples, aspects of the operations of 1805 may be performed by an SSB manager as described with reference to FIGS. 7 to 10.

At 1810, the UE 115 may report a PCI for the first cell to a first base station 105 based on the received first SSB. The operations of 1810 may be performed according to the methods described herein. In some examples, aspects of the operations of 1810 may be performed by a PCI reporting manager as described with reference to FIGS. 7 to 10.

At 1815, the UE 115 may receive, from the first base station 105 in response to the reported PCI, an instruction to report a CGI for the second base station 105. The operations of 1815 may be performed according to the methods described herein. In some examples, aspects of the operations of 1815 may be performed by a CGI reporting manager as described with reference to FIGS. 7 to 10.

At 1820, the UE 115 may determine that the first SSB was received off the synchronization raster. The operations of 1820 may be performed according to the methods described herein. In some examples, aspects of the operations of 1820 may be performed by a synchronization raster manager as described with reference to FIGS. 7 to 10.

At 1825, the UE 115 may determine a timing reference associated with a broadcast CGI based at least in part on the received first SSB. The operations of 1825 may be performed according to the methods described herein. In some examples, aspects of the operations of 1825 may be performed by an SSB manager as described with reference to FIGS. 7 to 10.

At 1830, the UE 115 may receive, from the second base station 105, a broadcast CGI based on a transmission pattern associated with the timing reference. The operations of 1830 may be performed according to the methods described herein. In some examples, aspects of the operations of 1830 may be performed by a CGI manager as described with reference to FIGS. 7 to 10.

At 1835, the UE 115 may identify the CGI based on the broadcast CGI. The operations of 1835 may be performed according to the methods described herein. In some examples, aspects of the operations of 1835 may be performed by a CGI manager as described with reference to FIGS. 7 to 10.

At 1840, the UE 115 may transmit the CGI to the first base station 105 based on the received instruction and whether the radio frequency band of the first SSB was received in a synchronization raster. The operations of 1840 may be performed according to the methods described herein. In some examples, aspects of the operations of 1840 may be performed by a CGI reporting manager as described with reference to FIGS. 7 to 10.

At 1845, the UE 115 may transmit the CGI to the first base station 105. The operations of 1845 may be performed according to the methods described herein. In some examples, aspects of the operations of 1845 may be performed by a CGI reporting manager as described with reference to FIGS. 7 to 10.

Figure 19:
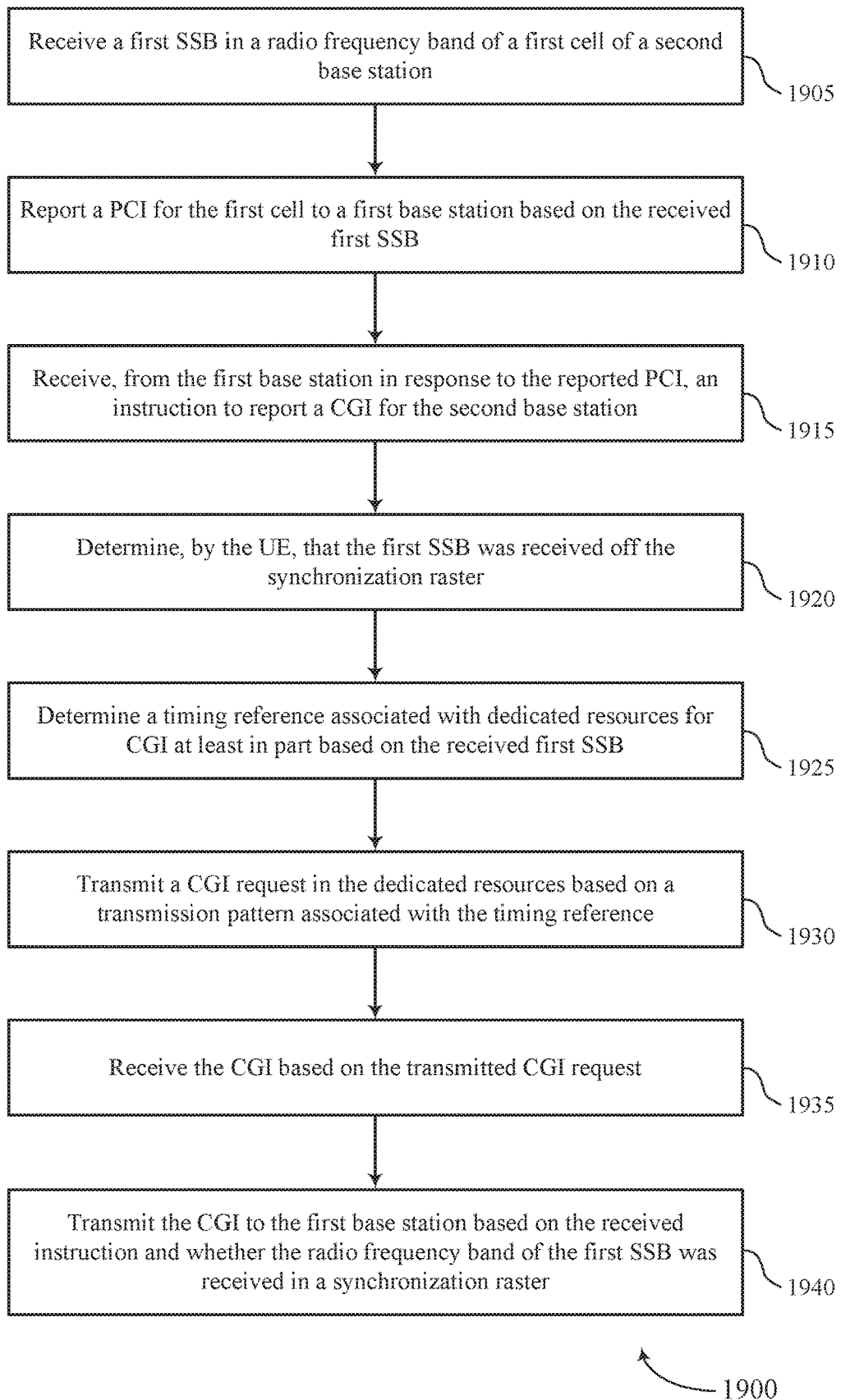

FIG. 19 shows a flowchart illustrating a method 1900 that supports measurement configuration for global cell identifier reporting in accordance with aspects of the present disclosure. The operations of method 1900 may be implemented by a UE 115 or its components as described herein. For example, the operations of method 1900 may be performed by a communications manager as described with reference to FIGS. 7 to 10. In some examples, a UE 115 may execute a set of instructions to control the functional elements of the UE 115 to perform the functions described below. Additionally or alternatively, a UE 115 may perform aspects of the functions described below using special-purpose hardware.

At 1905, the UE 115 may receive a first SSB in a radio frequency band of a first cell of a second base station 105. The operations of 1905 may be performed according to the methods described herein. In some examples, aspects of the operations of 1905 may be performed by an SSB manager as described with reference to FIGS. 7 to 10.

At 1910, the UE 115 may report a PCI for the first cell to a first base station 105 based on the received first SSB. The operations of 1910 may be performed according to the methods described herein. In some examples, aspects of the operations of 1910 may be performed by a PCI reporting manager as described with reference to FIGS. 7 to 10.

At 1915, the UE 115 may receive, from the first base station 105 in response to the reported PCI, an instruction to report a CGI for the second base station 105. The operations of 1915 may be performed according to the methods described herein. In some examples, aspects of the operations of 1915 may be performed by a CGI reporting manager as described with reference to FIGS. 7 to 10.

At 1920, the UE 115 may determine that the first SSB was received off the synchronization raster. The operations of 1920 may be performed according to the methods described herein. In some examples, aspects of the operations of 1920 may be performed by a synchronization raster manager as described with reference to FIGS. 7 to 10.

At 1925, the UE 115 may determine a timing reference associated with dedicated resources for CGI at least in part based on the received first SSB. The operations of 1925 may be performed according to the methods described herein. In some examples, aspects of the operations of 1925 may be performed by a dedicated resource manager as described with reference to FIGS. 7 to 10.

At 1930, the UE 115 may transmit a CGI request in the dedicated resources based on a transmission pattern associated with the timing reference. The operations of 1930 may be performed according to the methods described herein. In some examples, aspects of the operations of 1930 may be performed by a CGI manager as described with reference to FIGS. 7 to 10.

At 1935, the UE 115 may receive the CGI based on the transmitted CGI request. The operations of 1935 may be performed according to the methods described herein. In some examples, aspects of the operations of 1935 may be performed by a dedicated resource manager as described with reference to FIGS. 7 to 10.

At 1940, the UE 115 may transmit the CGI to the first base station 105 based on the received instruction and whether the radio frequency band of the first SSB was received in a synchronization raster. The operations of 1940 may be performed according to the methods described herein. In some examples, aspects of the operations of 1940 may be performed by a CGI reporting manager as described with reference to FIGS. 7 to 10.

Figure 20:
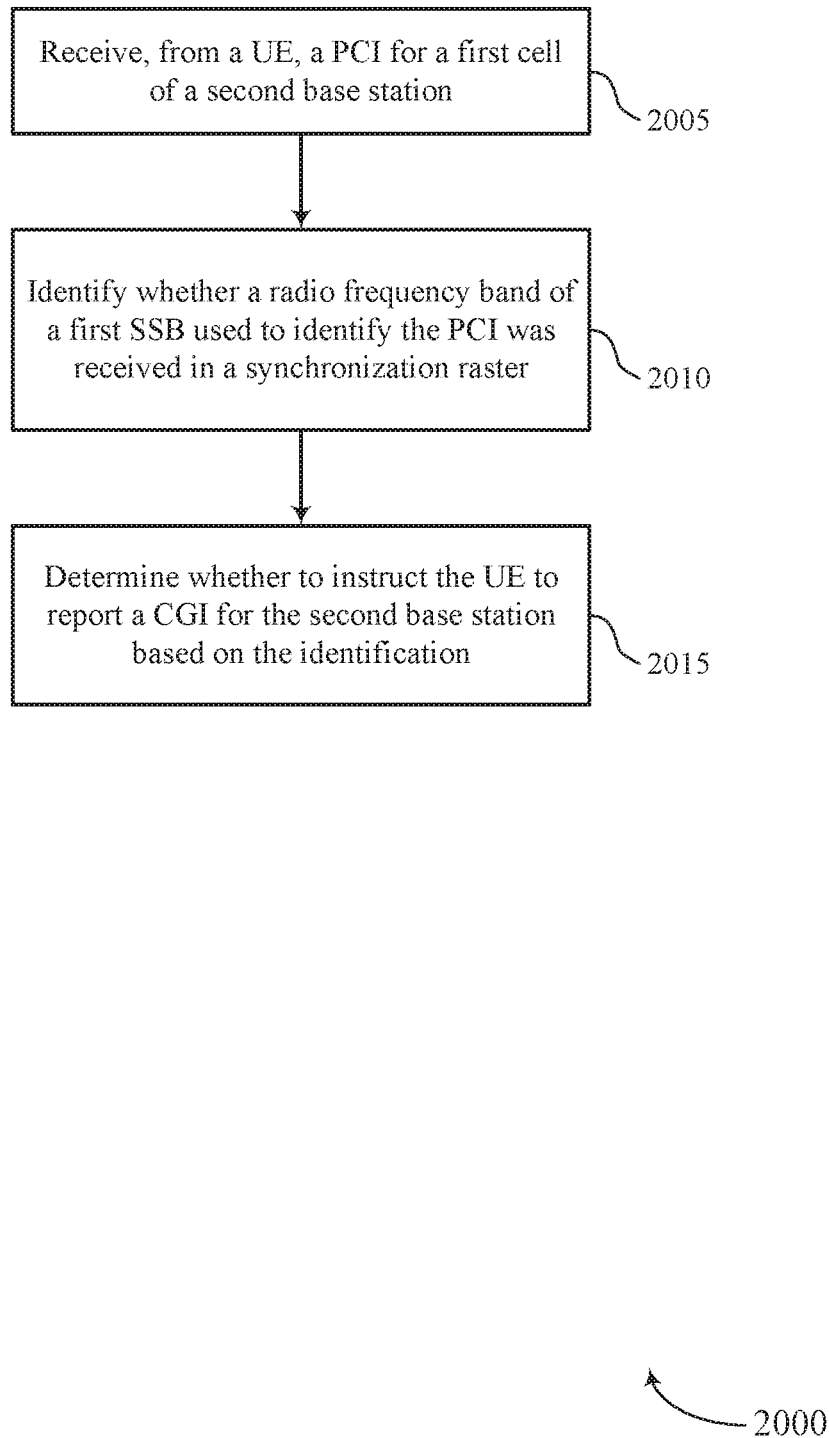

FIG. 20 shows a flowchart illustrating a method 2000 that supports measurement configuration for global cell identifier reporting in accordance with aspects of the present disclosure. The operations of method 2000 may be implemented by a base station 105 or its components as described herein. For example, the operations of method 2000 may be performed by a communications manager as described with reference to FIGS. 11 to 14. In some examples, a base station 105 may execute a set of instructions to control the functional elements of the base station 105 to perform the functions described below. Additionally or alternatively, a base station 105 may perform aspects of the functions described below using special-purpose hardware.

At 2005, a first base station 105 may receive, from a UE 115, a PCI for a first cell of a second base station 105. The operations of 2005 may be performed according to the methods described herein. In some examples, aspects of the operations of 2005 may be performed by a PCI manager as described with reference to FIGS. 11 to 14.

At 2010, the first base station 105 may identify whether a radio frequency band of a first SSB used to identify the PCI was received in a synchronization raster. The operations of 2010 may be performed according to the methods described herein. In some examples, aspects of the operations of 2010 may be performed by a synchronization raster manager as described with reference to FIGS. 11 to 14.

At 2015, the first base station 105 may determine whether to instruct the UE 115 to report a CGI for the second base station 105 based on the identification. The operations of 2015 may be performed according to the methods described herein. In some examples, aspects of the operations of 2015 may be performed by a neighbor CGI manager as described with reference to FIGS. 11 to 14.

Figure 21:
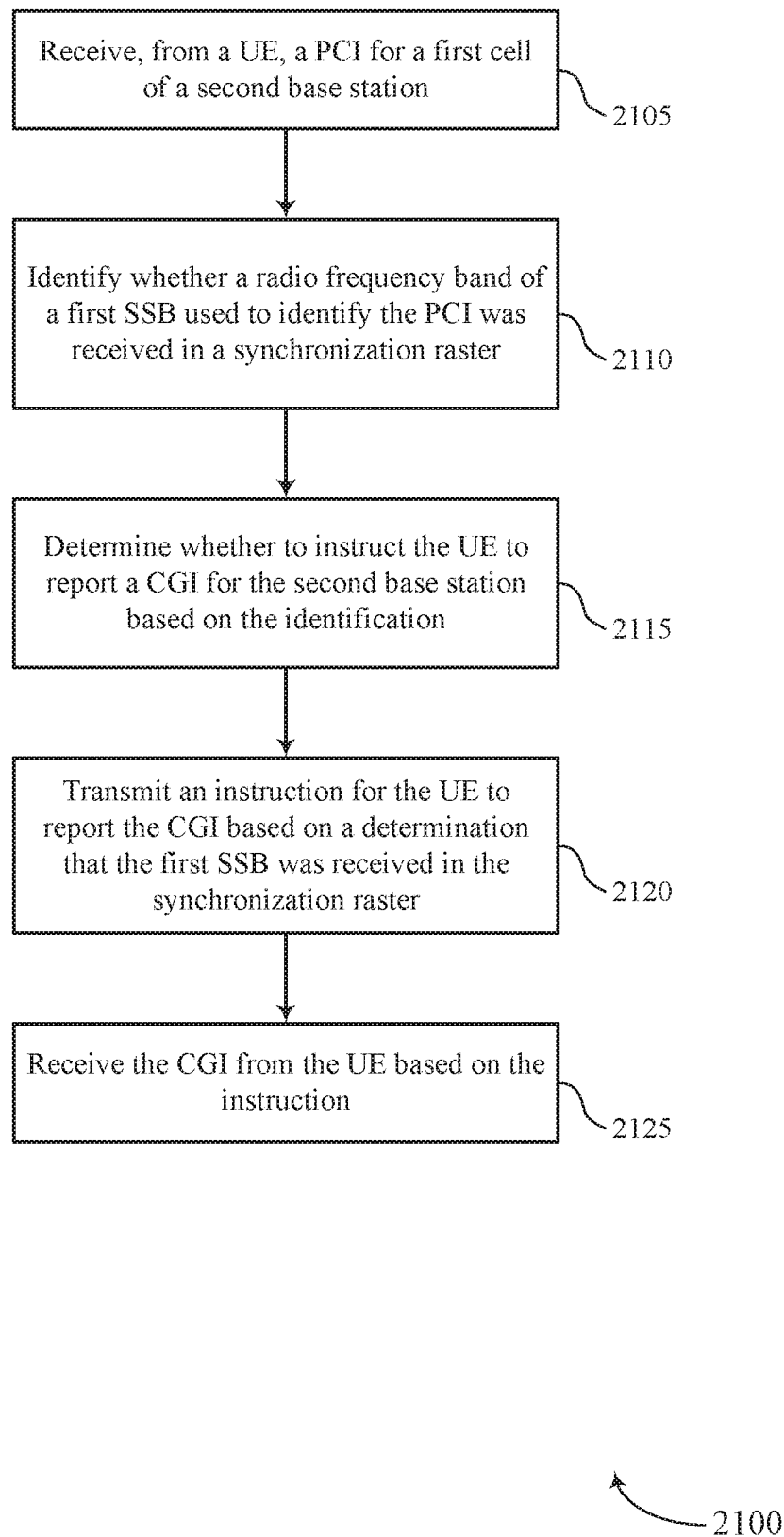

FIG. 21 shows a flowchart illustrating a method 2100 that supports measurement configuration for global cell identifier reporting in accordance with aspects of the present disclosure. The operations of method 2100 may be implemented by a base station 105 or its components as described herein. For example, the operations of method 2100 may be performed by a communications manager as described with reference to FIGS. 11 to 14. In some examples, a base station 105 may execute a set of instructions to control the functional elements of the base station 105 to perform the functions described below. Additionally or alternatively, a base station 105 may perform aspects of the functions described below using special-purpose hardware.

At 2105, a first base station 105 may receive, from a UE 115, a PCI for a first cell of a second base station 105. The operations of 2105 may be performed according to the methods described herein. In some examples, aspects of the operations of 2105 may be performed by a PCI manager as described with reference to FIGS. 11 to 14.

At 2110, the first base station 105 may identify whether a radio frequency band of a first SSB used to identify the PCI was received in a synchronization raster. The operations of 2110 may be performed according to the methods described herein. In some examples, aspects of the operations of 2110 may be performed by a synchronization raster manager as described with reference to FIGS. 11 to 14.

At 2115, the first base station 105 may determine whether to instruct the UE 115 to report a CGI for the second base station 105 based on the identification. The operations of 2115 may be performed according to the methods described herein. In some examples, aspects of the operations of 2115 may be performed by a neighbor CGI manager as described with reference to FIGS. 11 to 14.

At 2120, the first base station 105 may transmit an instruction for the UE 115 to report the CGI based on a determination that the first SSB was received in the synchronization raster. The operations of 2120 may be performed according to the methods described herein. In some examples, aspects of the operations of 2120 may be performed by a neighbor CGI manager as described with reference to FIGS. 11 to 14.

At 2125, the first base station 105 may receive the CGI from the UE 115 based on the instruction. The operations of 2125 may be performed according to the methods described herein. In some examples, aspects of the operations of 2125 may be performed by a neighbor CGI manager as described with reference to FIGS. 11 to 14.

Figure 22:
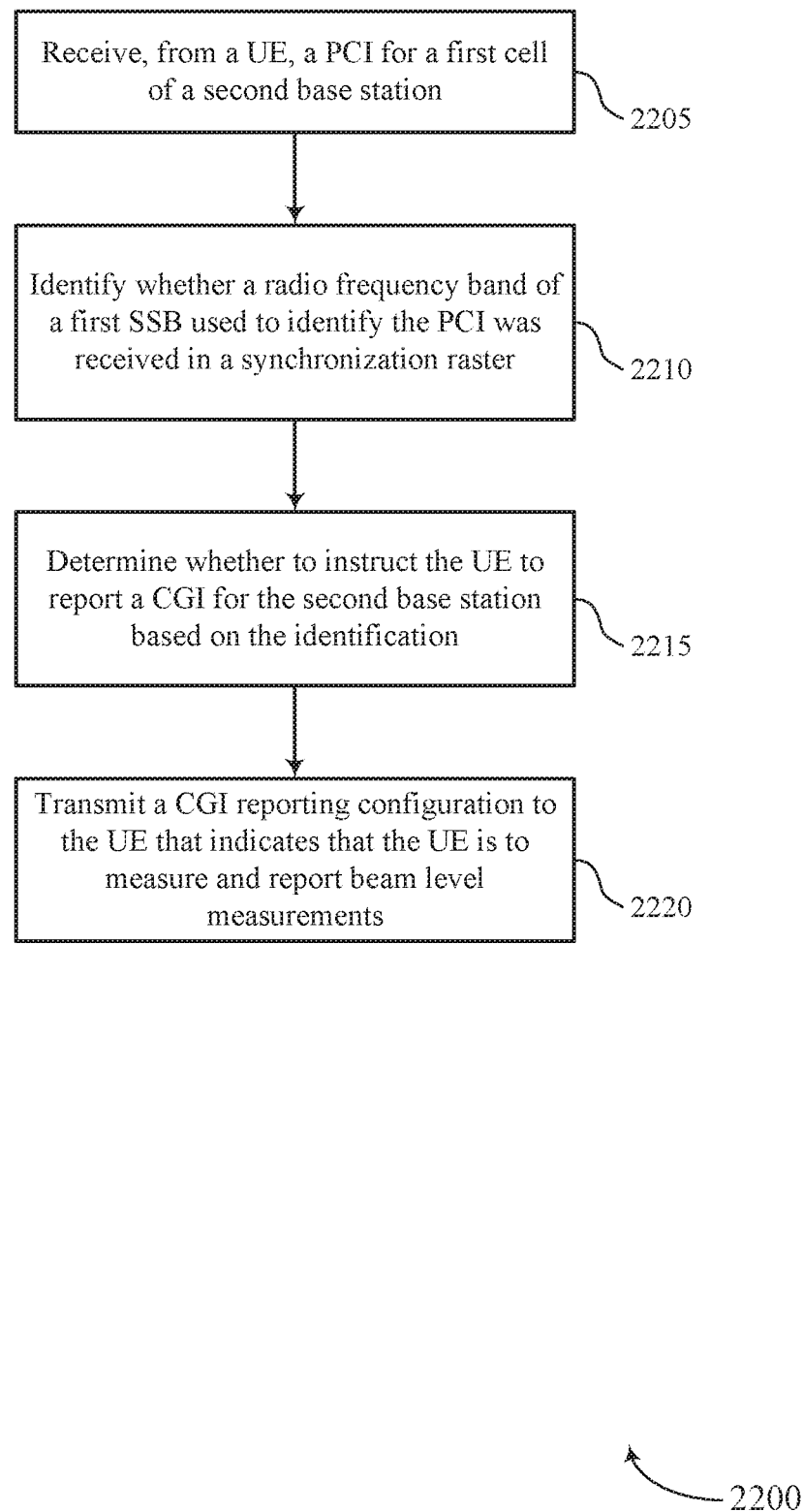

FIG. 22 shows a flowchart illustrating a method 2200 that supports measurement configuration for global cell identifier reporting in accordance with aspects of the present disclosure. The operations of method 2200 may be implemented by a base station 105 or its components as described herein. For example, the operations of method 2200 may be performed by a communications manager as described with reference to FIGS. 11 to 14. In some examples, a base station 105 may execute a set of instructions to control the functional elements of the base station 105 to perform the functions described below. Additionally or alternatively, a base station 105 may perform aspects of the functions described below using special-purpose hardware.

At 2205, a first base station 105 may receive, from a UE 115, a PCI for a first cell of a second base station 105. The operations of 2205 may be performed according to the methods described herein. In some examples, aspects of the operations of 2205 may be performed by a PCI manager as described with reference to FIGS. 11 to 14.

At 2210, the first base station 105 may identify whether a radio frequency band of a first SSB used to identify the PCI was received in a synchronization raster. The operations of 2210 may be performed according to the methods described herein. In some examples, aspects of the operations of 2210 may be performed by a synchronization raster manager as described with reference to FIGS. 11 to 14.

At 2215, the first base station 105 may determine whether to instruct the UE 115 to report a CGI for the second base station 105 based on the identification. The operations of 2215 may be performed according to the methods described herein. In some examples, aspects of the operations of 2215 may be performed by a neighbor CGI manager as described with reference to FIGS. 11 to 14.

At 2220, the first base station 105 may transmit a CGI reporting configuration to the UE 115 that indicates that the UE 115 is to measure and report beam level measurements. The operations of 2220 may be performed according to the methods described herein. In some examples, aspects of the operations of 2220 may be performed by a CGI reporting configuration manager as described with reference to FIGS. 11 to 14.

Embodiment 1: A method of wireless communication at a UE, comprising: receiving a first synchronization signal block (SSB) in a radio frequency band of a first cell of a first base station, reporting a physical cell identifier (PCI) for the first cell to a second base station based at least in part on the received first SSB, receiving, from the second base station in response to the reported PCI, an instruction to report a global cell identifier (CGI) for the first base station, and transmitting the CGI to the second base station based at least in part on the received instruction and whether the radio frequency band of the first SSB was received in a synchronization raster.

Embodiment 2: The method of embodiment 1, further comprising: determining, by the UE, that the first SSB was received in the synchronization raster.

Embodiment 3: The method of any embodiments 1 or 2, further comprising: receiving, from the first base station, system information associated with the first SSB, identifying the CGI based at least in part on the system information, and transmitting the CGI to the second base station.

Embodiment 4: The method of any of embodiments 1 to 3, further comprising: determining that system information is not associated with the first SSB, receiving, from the first base station, a second SSB wherein the second SSB is indicated at least in part by the first SSB, receiving, from the first base station, system information associated with the second SSB, wherein the second SSB is received based at least in part on the received first SSB, identifying the CGI based at least in part on the system information, and transmitting the CGI to the second base station.

Embodiment 5: The method of any of embodiments 1 to 4, further comprising: determining, by the UE, that the first SSB was received off the synchronization raster.

Embodiment 6: The method of any embodiments to 1 to 5, further comprising: determining system information is not associated with the first SSB, receiving an indication to determine system information associated with a second cell of the first base station, identifying the CGI based at least in part on the system information, and transmitting the CGI to the second base station.

Embodiment 7: The method of any of embodiments 1 to 6, wherein the second cell comprises a master long term evolution (LTE) evolved NodeB (eNB) of the first base station operating in a non-standalone mode.

Embodiment 8: The method of any embodiments 1 to 7, further comprising: determining a timing reference associated with a broadcast CGI based at least in part on the received first SSB, receiving, from the first base station, a broadcast CGI based at least in part on a transmission pattern associated with the timing reference, identifying the CGI based at least in part on the broadcast CGI, and transmitting the CGI to the second base station.

Embodiment 9: The method of any embodiments 1 to 8, wherein parameters of the transmission pattern comprise a transmission periodicity and an offset.

Embodiment 10: The method of any of embodiments 1 to 9, wherein parameters of the transmission pattern are obtained from system information.

Embodiment 11: The method of any of embodiments 1 to 10, further comprising: determining a timing reference associated with dedicated resources for CGI at least in part based on the received first SSB, transmitting a CGI request in the dedicated resources based at least in part on a transmission pattern associated with the timing reference, receiving the CGI based at least in part on the transmitted CGI request, and transmitting the CGI to the second base station.

Embodiment 12: The method of any of embodiments 1 to 11, wherein parameters of a transmission pattern of the dedicated resources for CGI comprise a transmission periodicity and an offset.

Embodiment 13: The method of any of embodiments 1 to 12, wherein parameters of a transmission pattern of the dedicated resources for CGI are obtained from system information.

Embodiment 14: The method of any of embodiments 1 to 13, wherein the CGI request is transmitted in a request of a random access procedure, and the CGI is received in a response of the random access procedure.

Embodiment 15: The method of any of embodiments 1 to 14, wherein the instruction to report the CGI is transmitted by the second base station based at least in part on a determination, by the second base station, that the first SSB was received in the synchronization raster.

Embodiment 16: The method of any of embodiments 1 to 15, wherein reporting the PCI comprises: transmitting a measurement report that includes the PCI for the first cell and a measurement identifier associated with receiving the first SSB, wherein the instruction to report the CGI is based at least in part on the PCI and the measurement identifier.

Embodiment 17, the method of any of embodiments 1 to 16, further comprising: receiving a first portion of the CGI in a first broadcast CGI message, receiving a second portion of the CGI in a second broadcast CGI message, and identifying the CGI based at least in part on the first portion and the second portion.

Embodiment 18, the method of any of embodiments 1 to 17, further comprising: identifying a CGI broadcast pattern based at least in part one or more SSBs of a plurality of SSBs, and receiving the CGI based at least in part on the identified CGI broadcast pattern.

Embodiment 19, the method of any of embodiments 1 to 18, wherein the first base station comprises a neighboring base station, and the second base station comprises a serving base station.

Embodiment 20: An apparatus comprising at least one means for performing a method of any of embodiments 1 to 19.

Embodiment 21: An apparatus for wireless communications at a first base station comprising a processor; memory in electronic communication with the processor; and instructions stored in the memory and executable by the processor to cause the apparatus to perform a method of any of embodiments 1 to 19.

Embodiment 22: A non-transitory computer-readable medium storing code for wireless communications, the code comprising instructions executable by a processor to perform a method of any of embodiments 1 to 19.

Embodiment 23: A method of wireless communication at a first base station, comprising: receiving, from a UE, a physical cell identifier (PCI) for a first cell of a second base station, identifying whether a radio frequency band of a first synchronization signal block (SSB) used to identify the PCI was received in a synchronization raster, and determining whether to instruct the UE to report a global cell identifier (CGI) for the second base station based at least in part on the identification.

Embodiment 24: The method of embodiment 23, further comprising: transmitting an instruction for the UE to report the CGI based at least in part on a determination that the first SSB was received in the synchronization raster, and receiving the CGI from the UE based at least in part on the instruction.

Embodiment 25: The method of any of embodiments 23 or 24, further comprising: refraining from instructing the UE to report the CGI based at least in part on a determination that the first SSB was received off the synchronization raster.

Embodiment 26: The method of any of embodiments 23 to 25, further comprising: transmitting an instruction for the UE to report the CGI based at least in part on a determination that the first SSB was received off the synchronization raster, and receiving the CGI from the UE based at least in part on the transmitted instruction.

Embodiment 27: The method of any of embodiments 23 to 26, further comprising transmitting an instruction for the UE to obtain system information from a second cell of the second base station to identify the CGI, and receiving the CGI from the UE in response to the transmitted instruction.

Embodiment 28: The method of any of embodiments 23 to 27, wherein the second cell comprises a master long term evolution (LTE) evolved NodeB (eNB) of the first base station operating in a non-standalone mode.

Embodiment 29: The method of any of embodiments 23 to 28, further comprising: transmitting a CGI reporting configuration to the UE, and receiving, from the UE, the CGI in a CGI report configured based at least in part on the transmitted CGI reporting configuration.

Embodiment 30: The method of any of embodiments 23 to 29, further comprising: transmitting a CGI reporting configuration to the UE that indicates that the UE is to measure and report cell level measurements.

Embodiment 31: The method of any of embodiments 23 to 30, further comprising: transmitting a CGI reporting configuration to the UE that indicates that the UE is to measure and report beam level measurements.

Embodiment 32: The method of any of embodiments 23 to 31, wherein the beam level measurements comprise a beam identifier.

Embodiment 33: The method of any of embodiments 23 to 32, wherein the beam level measurements comprise a beam quality.

Embodiment 34: The method of any of embodiments 23 to 33, wherein the beam level measurements comprise a beam identifier and beam quality.

Embodiment 35: An apparatus comprising at least one means for performing a method of any of embodiments 23 to 34.

Embodiment 36: An apparatus for wireless communications at a first base station comprising a processor; memory in electronic communication with the processor; and instructions stored in the memory and executable by the processor to cause the apparatus to perform a method of any of embodiments 23 to 34.

Embodiment 37: A non-transitory computer-readable medium storing code for wireless communications, the code comprising instructions executable by a processor to perform a method of any of embodiments 23 to 34.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a first synchronization signal block (SSB) in a radio frequency band of a first cell of a first base station;
    determining, by the UE, that the first SSB was received off the synchronization raster;
    reporting a physical cell identifier (PCI) for the first cell to a second base station based at least in part on the received first SSB;
    receiving, from the second base station in response to the reported PCI, an instruction to report a global cell identifier (CGI) for the first base station;
    determining a timing reference associated with a broadcast CGI based at least in part on the received first SSB;
    receiving, from the first base station, a broadcast CGI based at least in part on a transmission pattern associated with the timing reference;
    identifying the CGI based at least in part on the broadcast CGI; and
    transmitting the CGI to the second base station based at least in part on the received instruction and whether system information is associated with the first SSB.

2. The method of claim 1, wherein parameters of the transmission pattern comprise a transmission periodicity and an offset.

3. The method of claim 1, wherein parameters of the transmission pattern are obtained from system information.

4. A method for wireless communication at a user equipment (UE), comprising:
    receiving a first synchronization signal block (SSB) in a radio frequency band of a first cell of a first base station;
    determining that the first SSB was received off the synchronization raster;
    reporting a physical cell identifier (PCI) for the first cell to a second base station based at least in part on the received first SSB;
    receiving, from the second base station in response to the reported PCI, an instruction to report a global cell identifier (CGI) for the first base station;
    transmitting the CGI to the second base station based at least in part on the received instruction and whether system information is associated with the first SSB
    determining a timing reference associated with dedicated resources for CGI at least in part based on the received first SSB;
    transmitting a CGI request in the dedicated resources based at least in part on a transmission pattern associated with the timing reference;
    receiving the CGI based at least in part on the transmitted CGI request; and
    transmitting the CGI to the second base station.

5. The method of claim 4, wherein parameters of a transmission pattern of the dedicated resources for CGI comprise a transmission periodicity and an offset.

6. The method of claim 4, wherein parameters of a transmission pattern of the dedicated resources for CGI are obtained from system information.

7. The method of claim 4, wherein:
    the CGI request is transmitted in a request of a random access procedure; and
    the CGI is received in a response of the random access procedure.

8. A method for wireless communication at a first base station, comprising:
    receiving, from a user equipment (UE), a physical cell identifier (PCI) for a first cell of a second base station;
    identifying whether a radio frequency band of a first synchronization signal block (SSB) used to identify the PCI was received in a synchronization raster; and
    determining whether to instruct the UE to report a global cell identifier (CGI) for the second base station based at least in part on the identification.

9. The method of claim 8, further comprising:
transmitting an instruction for the UE to report the CGI based at least in part on a determination that the first SSB was received in the synchronization raster; and
receiving the CGI from the UE based at least in part on the instruct.

10. The method of claim 8, further comprising:
refraining from instructing the UE to report the CGI based at least in part on a determination that the first SSB was received off the synchronization raster.

11. The method of claim 8, further comprising:
transmitting an instruction for the UE to report the CGI based at least in part on a determination that the first SSB was received off the synchronization raster; and
receiving the CGI from the UE based at least in part on the transmitted instruction.

12. The method of claim 8, further comprising:
transmitting an instruction for the UE to obtain system information from a second cell of the second base station to identify the CGI; and
receiving the CGI from the UE in response to the transmitted instruction.

13. The method of claim 12, wherein the second cell comprises a master long term evolution (LTE) evolved NodeB (eNB) of the first base station operating in a non-standalone mode.

14. The method of claim 8, further comprising:
transmitting a CGI reporting configuration to the UE; and
receiving, from the UE, the CGI in a CGI report configured based at least in part on the transmitted CGI reporting configuration.

15. The method of claim 8, further comprising:
transmitting a CGI reporting configuration to the UE that indicates that the UE is to measure and report cell level measurements.

16. The method of claim 8, further comprising:
transmitting a CGI reporting configuration to the UE that indicates that the UE is to measure and report beam level measurements.

17. The method of claim 16, wherein the beam level measurements comprise a beam identifier.

18. The method of claim 16, wherein the beam level measurements comprise a beam quality.

19. The method of claim 16, wherein the beam level measurements comprise a beam identifier and beam quality.

20. An apparatus for wireless communication at a first base station, comprising:
a processor,
memory in electronic communication with the processor; and
instructions stored in the memory and executable by the processor to cause the apparatus to:
receive, from a user equipment (UE), a physical cell identifier (PCI) for a first cell of a second base station;
identify whether a radio frequency band of a first synchronization signal block (SSB) used to identify the PCI was received in a synchronization raster; and
determine whether to instruct the UE to report a global cell identifier (CGI) for the second base station based at least in part on the identification.

21. An apparatus for wireless communication at a first base station, comprising:
means for receiving, from a user equipment (UE), a physical cell identifier (PCI) for a first cell of a second base station;
means for identifying whether a radio frequency band of a first synchronization signal block (SSB) used to identify the PCI was received in a synchronization raster; and
means for determining whether to instruct the UE to report a global cell identifier (CGI) for the second base station based at least in part on the identification.

22. A non-transitory computer-readable medium storing code for wireless communication at a first base station, the code comprising instructions executable by a processor to:
receive, from a user equipment (UE), a physical cell identifier (PCI) for a first cell of a second base station;
identify whether a radio frequency band of a first synchronization signal block (SSB) used to identify the PCI was received in a synchronization raster; and
determine whether to instruct the UE to report a global cell identifier (CGI) for the second base station based at least in part on the identification.

\* \* \* \* \*